(12) United States Patent
Yamazaki

(10) Patent No.: US 8,060,032 B2
(45) Date of Patent: Nov. 15, 2011

(54) WIRELESS COMMUNICATION DEVICE

(75) Inventor: Daisuke Yamazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 12/333,481

(22) Filed: Dec. 12, 2008

(65) Prior Publication Data

US 2009/0238103 A1  Sep. 24, 2009

(30) Foreign Application Priority Data

Mar. 24, 2008 (JP) ................................. 2008-075994

(51) Int. Cl.
 *H03C 7/02* (2006.01)
(52) U.S. Cl. ...................................... 455/101; 375/219
(58) Field of Classification Search .................. 455/101; 375/219
See application file for complete search history.

(56) References Cited

U.S. PATENT DOCUMENTS

| 6,970,717 | B2 * | 11/2005 | Behrens et al. | ............ 455/553.1 |
| 7,075,906 | B2 * | 7/2006 | Douglas et al. | ............... 370/328 |
| 7,383,063 | B2 * | 6/2008 | Forrester | .................... 455/562.1 |
| 7,417,974 | B2 * | 8/2008 | Hansen | ......................... 370/334 |
| 7,583,627 | B2 * | 9/2009 | Hirsch | ........................... 370/320 |
| 2006/0013293 | A1 | 1/2006 | Hirsch | |

FOREIGN PATENT DOCUMENTS

| JP | 2001-285229 | 10/2001 |
| JP | 2006-502679 | 1/2006 |
| JP | 2006-319650 | 11/2006 |

* cited by examiner

*Primary Examiner* — Khai M Nguyen
(74) *Attorney, Agent, or Firm* — Katten Muchin Rosenman LLP

(57) ABSTRACT

A wireless communication device capable of restraining interference and thereby improving transmission quality. A wireless controller includes a wireless communication interface, and a baseband controller includes a baseband communication interface for controlling the transfer/reception of baseband signals, a logic circuit, and a memory. The wireless communication interface and the baseband communication interface are connected to each other by a communication line, and the memory stores, with respect to individual radio frequencies of a receive radio signal, bit rates for the communication line at which interference caused by noise produced around the communication line is minimized. When notified of a receive radio frequency, the logic circuit reads, from the memory, an optimum bit rate which corresponds to the receive radio frequency and at which the interference is minimized, and sets the optimum bit rate in the wireless communication interface and the baseband communication interface.

12 Claims, 16 Drawing Sheets

T1 TABLE

| RF Frequency | | | Digital I/F Bit Rate | RF Frequency | | | Digital I/F Bit Rate |
|---|---|---|---|---|---|---|---|
| 0.45 GHz | – | 0.55 GHz | 0.50 Gb/s | 3.05 GHz | – | 3.15 GHz | 1.55 Gb/s |
| 0.55 GHz | – | 0.65 GHz | 0.60 Gb/s | 3.15 GHz | – | 3.25 GHz | 1.60 Gb/s |
| 0.65 GHz | – | 0.75 GHz | 0.70 Gb/s | 3.25 GHz | – | 3.35 GHz | 1.65 Gb/s |
| 0.75 GHz | – | 0.85 GHz | 0.80 Gb/s | 3.35 GHz | – | 3.45 GHz | 1.70 Gb/s |
| 0.85 GHz | – | 0.95 GHz | 0.90 Gb/s | 3.45 GHz | – | 3.55 GHz | 1.75 Gb/s |
| 0.95 GHz | – | 1.05 GHz | 1.00 Gb/s | 3.55 GHz | – | 3.65 GHz | 1.80 Gb/s |
| 1.05 GHz | – | 1.15 GHz | 1.10 Gb/s | 3.65 GHz | – | 3.75 GHz | 1.85 Gb/s |
| 1.15 GHz | – | 1.25 GHz | 1.20 Gb/s | 3.75 GHz | – | 3.85 GHz | 1.90 Gb/s |
| 1.25 GHz | – | 1.35 GHz | 1.30 Gb/s | 3.85 GHz | – | 3.95 GHz | 1.95 Gb/s |
| 1.35 GHz | – | 1.45 GHz | 1.40 Gb/s | 3.95 GHz | – | 4.10 GHz | 1.00 Gb/s |
| 1.45 GHz | – | 1.55 GHz | 1.50 Gb/s | 4.10 GHz | – | 4.30 GHz | 1.05 Gb/s |
| 1.55 GHz | – | 1.65 GHz | 1.60 Gb/s | 4.30 GHz | – | 4.50 GHz | 1.10 Gb/s |
| 1.65 GHz | – | 1.75 GHz | 1.70 Gb/s | 4.50 GHz | – | 4.70 GHz | 1.15 Gb/s |
| 1.75 GHz | – | 1.85 GHz | 1.80 Gb/s | 4.70 GHz | – | 4.90 GHz | 1.20 Gb/s |
| 1.85 GHz | – | 1.95 GHz | 1.90 Gb/s | 4.90 GHz | – | 5.10 GHz | 1.25 Gb/s |
| 1.95 GHz | – | 2.05 GHz | 1.00 Gb/s | 5.10 GHz | – | 5.30 GHz | 1.30 Gb/s |
| 2.05 GHz | – | 2.15 GHz | 1.05 Gb/s | 5.30 GHz | – | 5.50 GHz | 1.35 Gb/s |
| 2.15 GHz | – | 2.25 GHz | 1.10 Gb/s | 5.50 GHz | – | 5.70 GHz | 1.40 Gb/s |
| 2.25 GHz | – | 2.35 GHz | 1.15 Gb/s | 5.70 GHz | – | 5.90 GHz | 1.45 Gb/s |
| 2.35 GHz | – | 2.45 GHz | 1.20 Gb/s | 5.90 GHz | – | 6.10 GHz | 1.50 Gb/s |
| 2.45 GHz | – | 2.55 GHz | 1.25 Gb/s | 6.10 GHz | – | 6.30 GHz | 1.55 Gb/s |
| 2.55 GHz | – | 2.65 GHz | 1.30 Gb/s | 6.30 GHz | – | 6.50 GHz | 1.60 Gb/s |
| 2.65 GHz | – | 2.75 GHz | 1.35 Gb/s | 6.50 GHz | – | 6.70 GHz | 1.65 Gb/s |
| 2.75 GHz | – | 2.85 GHz | 1.40 Gb/s | 6.70 GHz | – | 6.90 GHz | 1.70 Gb/s |
| 2.85 GHz | – | 2.95 GHz | 1.45 Gb/s | 6.90 GHz | – | 7.10 GHz | 1.75 Gb/s |
| 2.95 GHz | – | 3.05 GHz | 1.50 Gb/s | 7.10 GHz | – | 7.30 GHz | 1.80 Gb/s |

FIG. 5

WIRELESS COMMUNICATION DEVICE

CROSS-REFERENCE TO RELATED APPLICATION(S)

This application is based upon and claims the benefits of priority from the prior Japanese Patent Application No. 2008-075994, filed on Mar. 24, 2008, the entire contents of which are incorporated herein by reference.

BACKGROUND OF THE INVENTION

1. Field of the Invention

The present invention relates to a wireless communication device for performing wireless communication.

2. Description of the Related Art

A mobile phone terminal comprises, as its main components, an RF transceiver (RF-IC) for converting an RF (Radio Frequency) signal to a baseband signal and vice versa, and a baseband processor IC (PHY: physics) for processing the baseband signals. In recent years, the analog interface between the RF-IC and the PHY is being replaced by a digital interface.

As such digital interfaces, DigRF has been standardized for 3G (3rd Generation) applications and JC-61 has been standardized for WiMAX (Worldwide Interoperability for Microwave Access) applications.

These standards permit interconnection between the RF-IC and the PHY, and since hardware connectivity is guaranteed for ICs complying with the standards, the standardization is expected to accelerate liberalization of the digital mobile phone component market.

FIG. 14 illustrates a schematic configuration of a mobile phone terminal. The mobile phone terminal 5 comprises an antenna section 50, an RF-IC 60, and a PHY 70. The illustrated terminal is of a direct conversion type wherein an RF signal with a frequency equal to that of the carrier wave is directly converted to a baseband signal and vice verse without involving an IF (Intermediate Frequency) stage.

The antenna section 50 includes antennas 51 and 52, a switch 53, and band-pass filters 54a, 55b-1 and 55b-2. The RF-IC 60 includes amplifiers 61a, 61b-1 and 61b-2, an adder 62, mixers 63a-1, 63a-2 and 63b-1 to 63b-4, D/A converters 64a-1 and 64a-2, A/D converters 64b-1 to 64b-4, a multiplexer (MUX) 65, a demultiplexer (DEMUX) 66, a driver 67, a receiver 68, and a synthesizer 69. The PHY 70 includes a driver 71, a receiver 72, a multiplexer 73, a demultiplexer 74, and a logic circuit 75.

When the RF signal is to be received, the switch 53 switches to a receive side (the antenna 51 is connected to the input terminal of the band-pass filter 55b-1). The RF signal received by the antennas 51 and 52 is input to the band-pass filters 55b-1 and 55b-2 through which a desired RF frequency is passed to be sent to the RF-IC 60.

The RF signal output from the band-pass filter 55b-1 is applied to the amplifier 61b-1 in the RF-IC 60, and the amplifier 61b-1 provides differential outputs, which then are supplied to the mixers 63b-1 and 63b-2. Similarly, the RF signal output from the band-pass filter 55b-2 is applied to the amplifier 61b-2 in the RF-IC 60, and the amplifier 61b-2 provides differential outputs, which are input to the mixers 63b-3 and 63b-4.

The synthesizer 69 outputs in-phase (I) local signals I(+) and I(−) having the same frequency as the RF frequency (I(+) and I(−) are opposite in phase), and also outputs quadrature (Q) local signals Q(+) and Q(−) (Q(+) and Q(−) are opposite in phase) with the same frequency.

The mixer 63b-1 mixes the RF signal (+), which is one of the signals output from the amplifier 61b-1, with the local signal I(+) output from the synthesizer 69, to generate a baseband signal. Also, the mixer 63b-1 mixes the RF signal (−), which is the other signal output from the amplifier 61b-1, with the local signal I(−) output from the synthesizer 69, to generate a baseband signal.

On the other hand, the mixer 63b-2 mixes the RF signal (+) output from the amplifier 61b-1 with the local signal Q(+) output from the synthesizer 69, to generate a baseband signal. Also, the mixer 63b-2 mixes the RF signal (−) output from the amplifier 61b-1 with the local signal Q(−) output from the synthesizer 69, to generate a baseband signal. The mixers 63b-3 and 63b-4 carry out identical processes.

The analog baseband signals output from the mixers 63b-1 to 63b-4 are input to the A/D converters 64b-1 to 64b-4, respectively, which then perform analog/digital conversion to obtain digital baseband signals.

The A/D converter 64b-1 outputs an I digital baseband signal generated from the RF signal received by the antenna 51, and the A/D converter 64b-2 outputs a Q digital baseband signal generated from the RF signal received by the antenna 51.

Also, the A/D converter 64b-3 outputs an I digital baseband signal generated from the RF signal received by the antenna 52, and the A/D converter 64b-4 outputs a Q digital baseband signal generated from the RF signal received by the antenna 52.

The multiplexer 65 multiplexes the two I baseband signals output from the A/D converters 64b-1 and 64b-3 into one baseband signal, and also multiplexes the two Q baseband signals output from the A/D converters 64b-2 and 64b-4 into one baseband signal. The two, I and Q digital baseband signals thus obtained are output to the driver 67, which then sends the signals to the PHY 70.

In the PHY 70, the receiver 72 receives the digital baseband signals and outputs the received signals to the demultiplexer 74. The demultiplexer 74 demultiplexes the baseband signals into a number of signals equal to that before the multiplexing, which signals are sent to the logic circuit 75, where a predetermined process is performed on the received baseband signals.

A wireless technology using multiple antennas to transmit and receive data is called MIMO (Multiple Input Multiple Output). In the mobile phone terminal 5, the two antennas 51 and 52 are used to receive data, and the received data is multiplexed and then demultiplexed, thereby enabling communication tolerant to multipath fading.

When transmitting an RF signal, on the other hand, the switch 53 switches to a transmit side (the antenna 51 is connected to the output terminal of the band-pass filter 54a). The logic circuit 75 in the PHY 70 generates and outputs digital baseband signals, and the multiplexer 73 multiplexes the received baseband signals. The driver 71 sends the multiplexed baseband signals to the RF-IC 60.

In the RF-IC 60, the receiver 68 receives the multiplexed digital baseband signals and outputs the received signals to the demultiplexer 66. The demultiplexer 66 demultiplexes the baseband signals into the number of signals equal to that before the multiplexing, and outputs the demultiplexed signals to the D/A converters 64a-1 and 64a-2.

The D/A converters 64a-1 and 64a-2 each subject the corresponding baseband signal to digital/analog conversion, to generate two analog baseband signals. The mixer 63a-1 mixes one of the baseband signals output from the D/A converter 64a-1 with the local signal I(+) output from the synthesizer 69, to generate an RF signal. Also, the mixer 63a-1 mixes the other baseband signal output from the D/A converter 64*a*-1 with the local signal I(−) output from the synthesizer 69, to generate an RF signal.

On the other hand, the mixer 63*a*-2 mixes one of the baseband signals output from the D/A converter 64*a*-2 with the local signal Q(+) output from the synthesizer 69, to generate an RF signal. Also, the mixer 63*a*-2 mixes the other baseband signal output from the D/A converter 64*a*-2 with the local signal Q(−) output from the synthesizer 69, to generate an RF signal.

The adder 62 adds together the two signals output from the mixer 63*a*-1 and respectively mixed with the local signals I(+) and I(−), and also adds together the two signals output from the mixer 63*a*-2 and respectively mixed with the local signals Q(+) and Q(−), to generate I and Q RF signals.

The amplifier 61*a* combines differential inputs, namely, the two RF signals, into one signal, which is sent to the band-pass filter 54*a*. The band-pass filter 54*a* passes a desired RF frequency therethrough, the resulting RF signal being transmitted from the antenna 51 into the air.

As conventional techniques, a technique has been proposed wherein the interface between the radio portion and the baseband portion employs 8B/10B encoding for communication (PCT-based Unexamined Japanese Patent Publication No. 2006-502679 (paragraph nos. [0008] to [0013], FIG. 1)).

The range of bit rates that can be set for the digital interfaces between the RF-IC 60 and the PHY 70 of the mobile phone terminal 5 has its lower and upper limits determined, respectively, by the transmission band and the specifications of high-speed I/O devices (drivers, receivers, etc.). For example, where the RF signal received by the two branches (two antennas 51 and 52) has a frequency bandwidth of 20 MHz, the bandwidth of each of the two branch outputs after the mixing is about 10 MHz.

Also, provided the resolution of the digital signal after the A/D conversion is 10 bits (in FIG. 14, each signal line labeled "10 bits" represents ten 1-bit signal lines), the bandwidth of one A/D output line equals a bit rate of about 20 Mb/s. Accordingly, the lower-limit bit rate of the digital interface between the driver 67 and the receiver 72 is derived as 800 Mb/s (=20 Mb/s×10 bits×2 (two I and Q signals)×2 (two branches)).

The bit rate 800 MB/s is, however, a value reckoned taking account only of the I and Q signals; in practice, a minimum of 1 Gb/s is required where control signals, such as those for error correction by redundant encoding, and other header information are taken into consideration (as for the upper-limit bit rate, a maximum of about 3 Gb/s is currently available, depending on the specifications of high-speed I/O devices).

Conventional lower-speed interfaces between the RF-IC and the PHY used to have a bit rate of about 100 Mb/s. The RF frequency at the antenna section is of the order of several GHz (e.g., 1 GHz) and its frequency band is spaced significantly from that of the interface. Accordingly, conventional terminals are not associated with the problem that the transmission quality degrades due to noticeable interference.

In the latest mobile phone terminal 5, on the other hand, the digital interface between the RF-IC 60 and the PHY 70 has an even higher bit rate because of multiplexing and increased rate per signal line, as stated above.

Consequently, the frequency band of the signal transferred through the digital interface approaches the RF frequency band at the antenna section 50, and thus a problem arises in that noise produced at the digital interface leaks into the antenna section 50, causing such an interference as to degrade the transmission quality.

FIG. 15 is a conceptual diagram illustrating interference between the digital interface and the antenna section 50. The figure shows the manner of how noise produced at the digital interface leaks to the antenna section 50 through a certain isolation and enters the RF-IC 60 via an input terminal Pin for the RF signal.

Noise is thought to reach the antenna section 50 mainly through the air, GND (ground) or power supply, and electromagnetic waves generated at the digital interface travel through the air, GND or power supply to the antenna section 50. If such a phenomenon occurs, the noise affects the RF frequency and the noise-containing RF signal enters the RF-IC 60 and is processed, causing degradation of the transmission quality.

The term "isolation" represents an element that causes a change in the amount of interference (the amount of noise leak) and is an index indicating to what extent the interference is reduced. For example, where the signal output from the output terminal of a certain circuit fluctuates by 1 V and if the isolation between the input and output terminals of the circuit is −60 dB, the signal input to the input terminal fluctuates by 1 mV due to the interference. (When converted to antilogarithm, −60 dB equals $10^{-60/20}$=0.001, and therefore, a fluctuation corresponding to 1/1000 of 1 V appears at the input terminal. Namely, 1 V×0.001=1 mV.)

Similarly, if the isolation is −80 dB, the signal input to the input terminal fluctuates by 0.1 mV. (When converted to antilogarithm, −80 dB equals $10^{-80/20}$=0.0001, and therefore, 1 V×0.0001=0.1 mV.) If the isolation is −100 dB, the signal input to the input terminal fluctuates by 0.01 mV. (When converted to antilogarithm, −100 dB equals $10^{-100/200}$=0.00001, and therefore, 1 V×0.00001=0.01 mV.)

Interference occurs to a certain extent, and the amount of interference varies also in accordance with the value of the isolation as mentioned above. (Under the same environmental conditions, the smaller the value of the isolation, the smaller the amount of interference becomes.)

FIG. 16 represents frequency spectra of signals traveling through the digital interface, wherein the vertical axis indicates signal strength (mVrms) and the horizontal axis indicates frequency (MHz). The figure represents simulation results obtained with NRZ (non-return to zero) signals transferred through the digital interface between the driver 67 and the receiver 72.

Spectrum g1 represents the strength of a signal traveling through the digital interface at a bit rate of 1 Gb/s, and spectrum g2 represents the strength of a signal traveling through the digital interface at a bit rate of 1.5 Gb/s.

Where the isolation between the digital interface and the input terminal Pin is −120 dB, the strength of the signal at the digital interface is, in the case of the spectrum g1, equal to 8.6 mVrms at the RF frequency 1.5 GHz, and therefore, noise leaking from the digital interface into the input terminal Pin is equal to 8.6 nVrms (=8.6 mVrms×0.000001).

Usually, the amplitude of the RF signal at the input terminal Pin has a small value of about 1 nV, and when the bit rate of the digital interface is 1 Gb/s as in the spectrum g1, the noise has an amplitude greater than that of the signal (1 nV<8.6 nV). Consequently, the isolation value −120 dB is not small enough, and the isolation needs to be lowered further.

To set the isolation to a desired value, design and implementation may be modified so that the amount of interference may fall within an allowable range (e.g., a multilayer substrate is used to increase the thickness of the GND pattern). This technique, however, leads to increase in cost.

On the other hand, when the bit rate of the digital interface is 1.5 Gb/s as in the spectrum g2, the signal strength at the digital interface is equal to 0.2 mVrms at the RF frequency 1.5 GHz, and therefore, noise leaking from the digital interface into the input terminal Pin is equal to 0.2 nVrms (=0.2 mVrms×0.000001). In this case, the amplitude of the signal is greater than that of the noise (0.2 nV<1 nV).

Accordingly, where the isolation is −120 dB, the amount of noise leak can be reduced by raising the bit rate of the digital interface to 1.5 Gb/s. This holds true, however, only with respect to the RF frequency 1.5 GHz. The RF frequency varies depending on the wireless communication standard and the country where the terminal is used. In practice, therefore, a specific frequency cannot be set, and it is not possible to restrict the amount of noise leak to a fixed level or lower with respect to various RF frequencies.

For example, in FIG. 16, the relationship of signal strength between the spectra g1 and g2 is reversed at the RF frequency 2 GHz, compared with the relationship at the RF frequency 1.5 GHz. This reveals that for the same isolation (=−120 dB) and at the RF frequency 2 GHz, the amount of noise leak is greater when the bit rate of the digital interface is 1.5 Gb/s (spectrum g2) than when the bit rate of the digital interface is 1 Gb/s (spectrum g1).

In the case of lower RF frequencies represented in FIG. 16, the signal strength at the digital interface is high irrespective of at what bit rate the NRZ signal may be transferred, under the condition that the bit rate of the digital interface is at or above 1 Gb/s, for example. With respect to low RF frequencies, therefore, significant noise is produced at all times.

Thus, with increase in the bit rate of the digital interface between the RF-IC and the PHY, the extent to which the digital interface interferes with the antenna section 50 increases. Since the amount of noise leak varies depending on the RF frequency, however, the interference cannot be effectively restrained by merely setting the bit rate of the digital interface to a specific value.

Future RF-ICs are required to deal with various RF frequencies on a single chip, and thus it is difficult to restrain noise over the entire RF frequency range with the bit rate between the RF-IC and the PHY fixed.

SUMMARY OF THE INVENTION

The present invention was created in view of the above circumstances, and an object thereof is to provide a wireless communication device capable of adaptively setting the bit rate of a digital interface between RF-IC and PHY to thereby restrain interference and improve transmission quality.

To achieve the object, there is provided a wireless communication device for performing wireless communication. The wireless communication device comprises an antenna section for transmitting and receiving a radio signal, a wireless controller for converting the receive radio signal to a receive baseband signal and converting a transmit baseband signal to the radio signal, the wireless controller including a wireless communication interface for controlling transfer of the receive baseband signal converted from the receive radio signal and reception of the transmit baseband signal, and a baseband controller for processing the transmit baseband signal and the receive baseband signal, the baseband controller including a baseband communication interface connected to the wireless communication interface by a communication line, for controlling transfer/reception of the transmit and receive baseband signals, a memory, and a logic circuit for variably setting a bit rate of the communication line, wherein the memory stores applicable bit rates for the communication line in association with respective different radio frequencies of the receive radio signal, and the logic circuit reads, from the memory, a bit rate corresponding to the frequency of the receive radio signal and sets the read bit rate as a transfer rate between the wireless communication interface and the baseband communication interface.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 illustrates a table.

DESCRIPTION OF THE PREFERRED EMBODIMENTS

Figure 1:
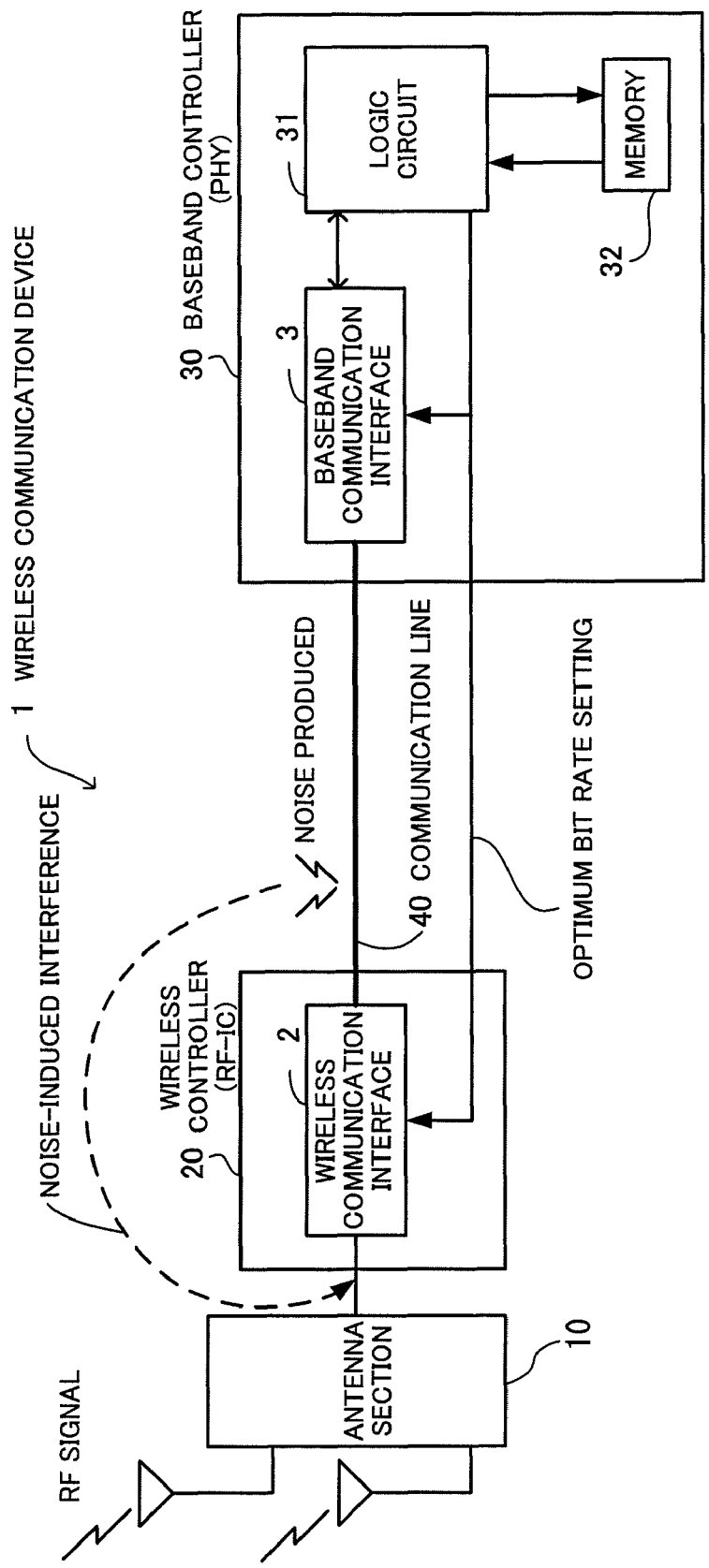
FIG. 1 illustrates the principle of a wireless communication device.

Preferred embodiments of the present invention will be described below with reference to the accompanying drawings, wherein like reference numerals refer to like elements throughout. FIG. 1 illustrates the principle of a wireless communication device. The wireless communication device 1 comprises an antenna section 10, a wireless controller 20 (hereinafter RF-IC 20), and a baseband controller 30 (hereinafter PHY 30). The RF-IC 20 and the PHY 30 are interconnected by a communication line 40.

The antenna section 10 transmits and receives RF signals through antennas. The RF-IC 20 includes a wireless communication interface (I/F) 2. The wireless communication interface 2 controls transfer of a baseband signal (receive baseband signal) converted from the RF signal to the PHY 30 and also controls reception of a baseband signal (transmit baseband signal) from the PHY 30.

The PHY 30 includes a baseband communication interface 3, a logic circuit 31, and a memory 32. The baseband communication interface 3 controls transfer of the baseband signal received from the logic circuit 31 to the RF-IC 20 and also controls reception of the baseband signal from the RF-IC 20.

The logic circuit 31 performs a process of generating and receiving baseband signals and also variably sets the bit rate of the communication line 40.

When a signal is transferred at high speeds through the communication line 40, noise is produced around the communication line 40 interconnecting the wireless communication interface 2 and the baseband communication interface 3 and interferes with the antenna section 10 as well as with the junction between the antenna section 10 and the RF-IC 20.

The expression "around the communication line 40" signifies not only a region surrounding the communication line 40 itself, which is a signal line interconnecting the wireless communication interface 2 and the baseband communication interface 3, but also a region surrounding the circuitry of the wireless communication interface 2 and a region surrounding the circuitry of the baseband communication interface 3.

To restrain such interference, the memory 32 stores a table showing a plurality of different bit rates for the communication line 40 in association with different RF frequencies of the RF signal received by the antenna section 10 in such a manner that the RF frequencies are associated with their respective bit rates at which the amount of noise leak is minimized.

When notified of a receive RF frequency to be received (base station notifies in advance the device 1 of the RF frequency to be used), the logic circuit 31 reads, from the memory 32, an applicable bit rate (optimum bit rate) which corresponds to the receive RF frequency and at which the amount of noise leak is minimized, and sets the optimum bit rate in the wireless communication interface 2 and the baseband communication interface 3 (e.g., the frequency of the PLL (Phase Locked Loop) in each of the wireless communication interface 2 and the baseband communication interface 3 is set to the optimum bit rate).

The wireless communication interface 2 and the baseband communication interface 3 carry out signal transfer via the communication line 40 at the optimum bit rate set in this manner. Thus, the bit rate of the communication line 40 interconnecting the wireless controller 20 and the baseband controller 30 is adaptively set in accordance with the receive RF frequency, thereby restraining the interference and improving the transmission quality.

Figure 2:
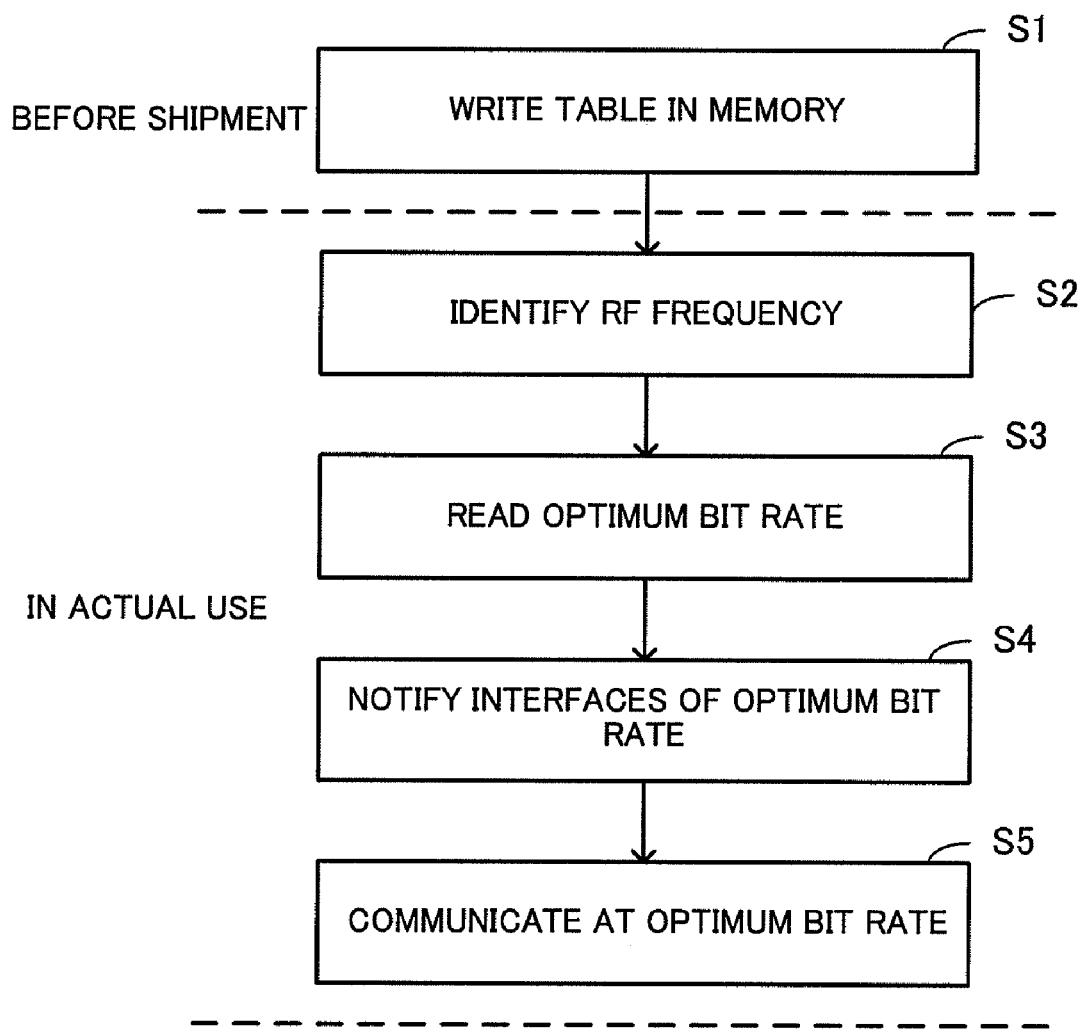
FIG. 2 is a flowchart illustrating the manner of how an optimum bit rate is set.

FIG. 2 is a flowchart illustrating the manner of how the optimum bit rate is set, wherein Step S1 is executed before factory shipment and Steps S2 to S5 are executed when the wireless communication device is actually used.

S1: A table, which indicates the correspondence between RF frequencies and bit rates at which noise produced from the communication line 40 at the respective RF frequencies is minimized, is written in the memory 32 (specific table configuration will be explained later with reference to FIG. 5).

S2: The logic circuit 31 in the PHY 30 identifies the receive RF frequency.

S3: The logic circuit 31 reads, from the memory 32, the optimum bit rate of the communication line 40 that corresponds to the receive RF frequency.

S4: The logic circuit 31 notifies the wireless communication interface 2 and the baseband communication interface 3 of the optimum bit rate.

S5: The wireless communication interface 2 and the baseband communication interface 3 (i.e., the RF-IC 20 and the PHY 30) perform signal transfer via the communication line 40 at the optimum bit rate.

Figure 3:
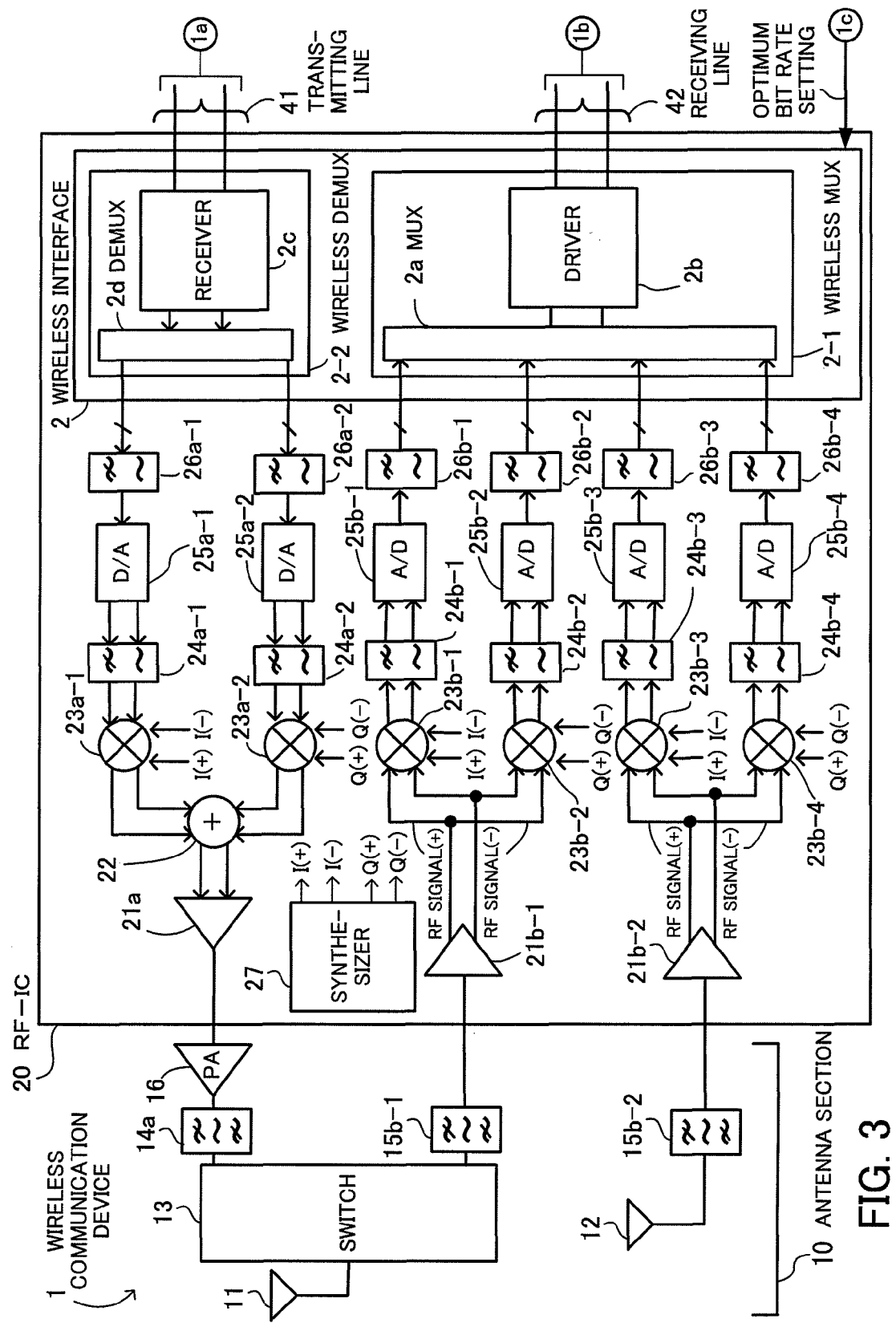
FIG. 3 is a first block diagram of the wireless communication device.
Figure 4:
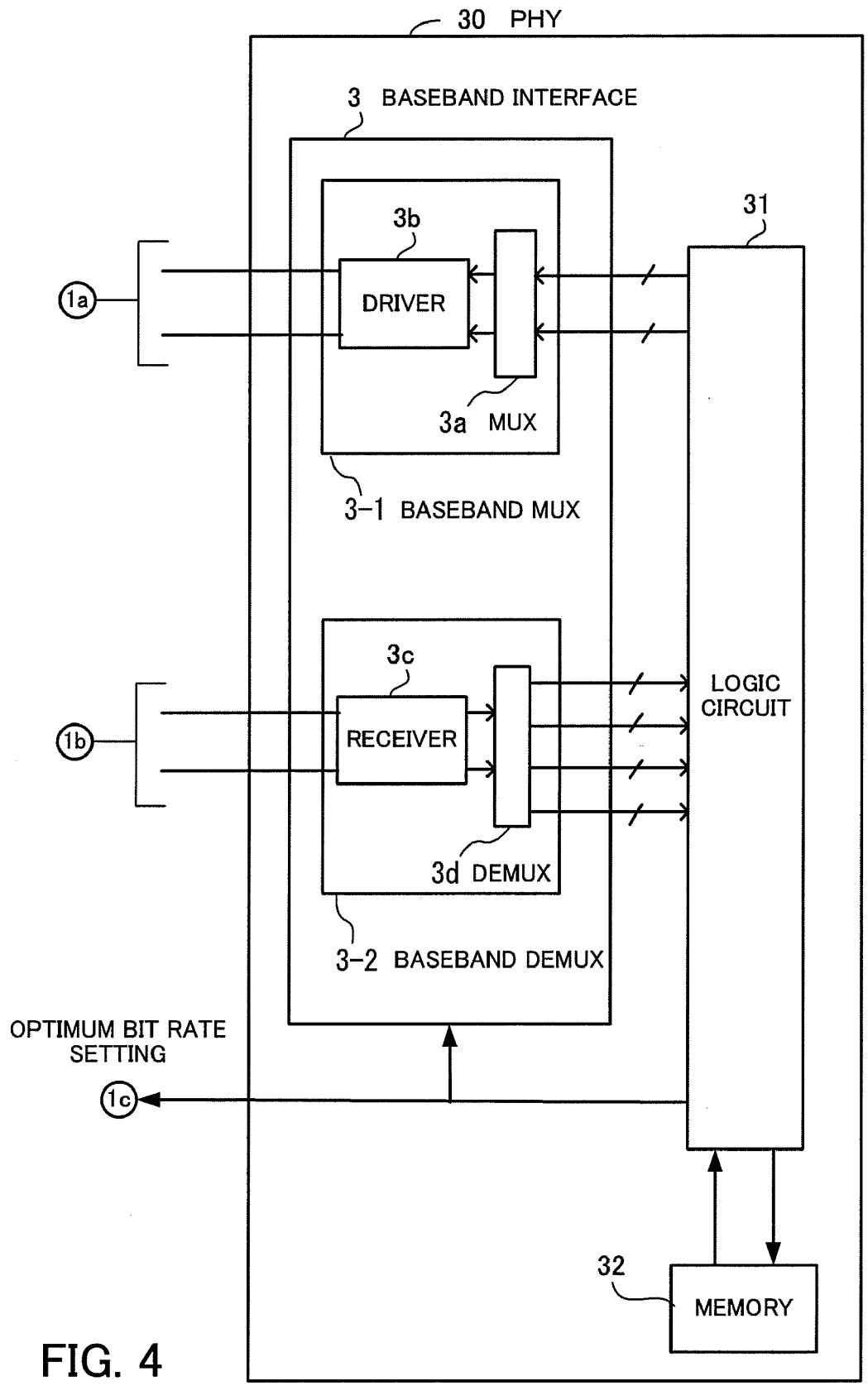
FIG. 4 is a second block diagram of the wireless communication device.

The configuration and operation of the wireless communication device 1 will be now described. FIGS. 3 and 4 are block diagrams of the wireless communication device 1. The wireless communication device 1 comprises the antenna section 10, the RF-IC 20, and the PHY 30 and carries out wireless communication according to direct conversion scheme.

The antenna section 10 includes antennas 11 and 12, a switch 13, band-pass filters 14a, 15b-1 and 15b-2, and a power amplifier 16. The antenna 11 is used for both transmission and reception, while the antenna 12 is used for reception only.

The switch 13 connects the antenna 11 to the output terminal of the band-pass filter 14a when data is to be transmitted, and connects the antenna 11 to the input terminal of the band-pass filter 15b-1 when data is to be received.

The band-pass filter 14a is an RF filter for transmission and is connected between the output terminal of the power amplifier 16 and the switch 13. The band-pass filters 15b-1 and 15b-2 are each an RF filter for reception. The band-pass filter 15b-1 is inserted between the switch 13 and the RF-IC 20, and the band-pass filter 15b-2 is inserted between the antenna 12 and the RF-IC 20.

The RF-IC 20 includes amplifiers 21a, 21b-1 and 21b-2, an adder 22, mixers 23a-1, 23a-2 and 23b-1 to 23b-4, low-pass filters 24a-1, 24a-2 and 24b-1 to 24b-4, D/A converters 25a-1 and 25a-2, A/D converters 25b-1 to 25b-4, low-pass filters 26a-1, 26a-2 and 26b-1 to 26b-4, and the wireless communication interface 2.

The wireless communication interface 2 comprises a wireless communication multiplexer 2-1 and a wireless communication demultiplexer 2-2. The wireless communication multiplexer 2-1 includes a multiplexer 2a and a driver 2b, and the wireless communication demultiplexer 2-2 includes a receiver 2c and a demultiplexer 2d.

The PHY 30 comprises the baseband communication interface 3, the logic circuit 31, and the memory 32. The baseband communication interface 3 includes a baseband communication multiplexer 3-1 and a baseband communication demultiplexer 3-2. The baseband communication multiplexer 3-1 includes a multiplexer 3a and a driver 3b, and the baseband communication demultiplexer 3-2 includes a receiver 3c and a demultiplexer 3d.

The communication line 40 comprises a transmitting line 41 and a receiving line 42 (the transmitting and receiving lines 41 and 42 are both digital interface lines). The driver 2b in the wireless communication interface 2 and the receiver 3c in the baseband communication interface 3 are connected to each other by the receiving line 42 of the communication line 40. The driver 3b in the baseband communication interface 3 and the receiver 2c in the wireless communication interface 2 are connected to each other by the transmitting line 41 of the communication line 40.

The process of receiving an RF signal will be now described. When data is to be received, the switch 13 switches to a receive side (the antenna 11 is connected to the input terminal of the band-pass filter 15b-1). The RF signal received by the antennas 11 and 12 is passed through the band-pass filters 15b-1 and 15b-2 to extract a desired RF frequency and then sent to the RF-IC 20.

The RF signal output from the band-pass filter 15b-1 is supplied to the amplifier 21b-1 in the RF-IC 20, which amplifier provides differential outputs to the mixers 23b-1 and 23b-2. The RF signal output from the band-pass filter 15b-2 is supplied to the amplifier 21b-2 in the RF-IC 20, and the amplifier 21b-2 provides differential outputs to the mixers 23b-3 and 23b-4.

The synthesizer 27 outputs in-phase (I) local signals I(+) and I(−) having the same frequency as the RF frequency (I(+) and I(−) are opposite in phase), and also outputs quadrature (Q) local signals Q(+) and Q(−) (Q(+) and Q(−) are opposite in phase) with the same frequency.

The mixer 23b-1 mixes the RF signal (+) output from the amplifier 21b-1 with the local signal I(+) output from the synthesizer 27, to generate a baseband signal. Also, the mixer 23b-1 mixes the RF signal (−) output from the amplifier 21b-1 with the local signal I(−) output from the synthesizer 27, to generate a baseband signal.

On the other hand, the mixer 23b-2 mixes the RF signal (+) output from the amplifier 21b-1 with the local signal Q(+) output from the synthesizer 27, to generate a baseband signal. Also, the mixer 23b-2 mixes the RF signal (−) output from the amplifier 21b-1 with the local signal Q(−) output from the synthesizer 27, to generate a baseband signal. The mixers 23b-3 and 23b-4 carry out identical processes.

The analog baseband signals output from the mixers 23b-1 to 23b-4 are input to the low-pass filters 24b-1 to 24b-4 for filtering, respectively, and the filtered baseband signals are supplied to the A/D converters 25b-1 to 25b-4, respectively.

The low-pass filters 24b-1 to 24b-4 preceding the respective A/D converters 25b-1 to 25b-4 are anti-aliasing filters for passing only signal frequencies up to ½ of the sampling frequency before the analog signals are converted to digital signals, in order to prevent the occurrence of aliasing (folding noise-induced distortion).

The A/D converters 25b-1 to 25b-4 carry out analog/digital conversion to obtain digital baseband signals, which are then filtered by the respective low-pass filters 26b-1 to 26b-4.

The multiplexer 2a multiplexes the received baseband signals and outputs the multiplexed signals to the driver 2b. The driver 2b sends the digital baseband signals to the PHY 30 through the receiving line 42.

In the PHY 30, the receiver 3c receives the digital baseband signals and outputs the received signals to the demultiplexer 3d. The demultiplexer 3d demultiplexes the baseband signals into the number of signals equal to that before the multiplexing and sends the demultiplexed signals to the logic circuit 31, where a predetermined process is performed on the received baseband signals.

The process of transmitting an RF signal will be now described. When transmitting data, the switch 13 switches to a transmit side (the antenna 11 is connected to the output terminal of the band-pass filter 14a). The logic circuit 31 in the PHY 30 generates and outputs digital baseband signals, and the multiplexer 3a multiplexes the received baseband signals. The driver 3b sends the multiplexed baseband signals to the RF-IC 20 through the transmitting line 41.

In the RF-IC 20, the receiver 2c receives the multiplexed baseband signals and outputs the received signals to the demultiplexer 2d. The demultiplexer 2d demultiplexes the baseband signals into the number of signals equal to that before the multiplexing, and outputs the demultiplexed signals to the D/A converters 25a-1 and 25a-2.

The D/A converters 25a-1 and 25a-2 each subject the corresponding baseband signal to digital/analog conversion, to generate two analog baseband signals. The analog baseband signals are then filtered by the low-pass filters 24a-1 and 24a-2.

The mixer 23a-1 mixes one of the baseband signals output from the low-pass filter 24a-1 with the local signal I(+) output from the synthesizer 27, to generate an RF signal. Also, the mixer 23a-1 mixes the other baseband signal output from the low-pass filter 24a-1 with the local signal I(−) output from the synthesizer 27, to generate an RF signal.

On the other hand, the mixer 23a-2 mixes one of the baseband signals output from the low-pass filter 24a-2 with the local signal Q(+) output from the synthesizer 27, to generate an RF signal. Also, the mixer 23a-2 mixes the other baseband signal output from the low-pass filter 24a-2 with the local signal Q(−) output from the synthesizer 27, to generate an RF signal.

The adder 22 adds together the two signals output from the mixer 23a-1 and respectively mixed with the local signals I(+) and I(−), and also adds together the two signals output from the mixer 23a-2 and respectively mixed with the local signals Q(+) and Q(−), to generate I and Q RF signals.

The amplifier 21a combines its differential inputs, namely, the two RF signals, into one signal, which is sent to the band-pass filter 14a. The band-pass filter 14a passes a desired RF frequency therethrough, the resulting RF signal being transmitted from the antenna 11 into the air.

The table registered in the memory 32 will be now described with reference to FIG. 5. The table T1 includes columns labeled RF frequency and digital interface bit rate. With respect to various RF frequencies to be received, bit rates for the receiving line 42 are registered at which noise produced around the receiving line 42 at the respective RF frequencies can be minimized (the amount of noise leak that interferes with the antenna section 10 can be minimized).

The values registered in the table T1 bear a relationship such that an integer multiple of each bit rate falls within the corresponding range of RF frequencies. Specifically, in the case of group G1 of bit rates ranging from 0.50 Gb/s to 1.90 Gb/s as indicated in the table T1, the bit rate values "0.50" to "1.90" themselves fall within the respective ranges of RF frequencies (e.g., the bit rate value "0.50" (0.50 Gb/s) times "1" is "0.50", and the value "0.50" falls within the RF frequency range from 0.45 GHz to 0.55 GHz).

Also, in the case of group G2 of bit rates ranging from 1.00 Gb/s to 1.95 Gb/s, the twofold values of the bit rates 1.00 Gb/s to 1.95 Gb/s fall within the respective ranges of RF frequencies (e.g., the bit rate value "1.00" (1.00 Gb/s) times "2" is "2.00", and the value "2.00" falls within the RF frequency range from 1.95 GHz to 2.05 GHz).

Further, with respect to group G3 of bit rates ranging from 1.00 Gb/s to 1.80 Gb/s, the fourfold values of the bit rates 1.00 Gb/s to 1.80 Gb/s fall within the respective ranges of RF frequencies (e.g., the bit rate value "1.00" (1.00 Gb/s) times "4" is "4.00", and the value "4.00" falls within the RF frequency range from 3.95 GHz to 4.10 GHz).

In this manner, the values registered in the table T1 are in the relationship such that integer multiples of the bit rates fall under the respective ranges of RF frequencies, and therefore, when the table is created, the values obtained by dividing the receive RF frequencies by the respective integers have only to be registered as the bit rates. Also, as seen from the illustrated table T1, the bit rates to be set may be restricted to those not higher than 3 Gb/s in conformity to the existing digital interface standards.

The process of setting the optimum bit rate will be now described with reference to FIGS. 3 and 4. When notified of the receive RF frequency that the device is to receive, the logic circuit 31 reads, from the table T1 stored in the memory 32, a bit rate (optimum bit rate) corresponding to the receive RF frequency.

The read bit rate is set basically in the following manner. For the wireless communication interface 2, the optimum bit rate is set with respect to the multiplexer 2a and the demultiplexer 2d, and for the baseband communication interface 3, the optimum bit rate is set with respect to the multiplexer 3a and the demultiplexer 3d.

Figure 16:
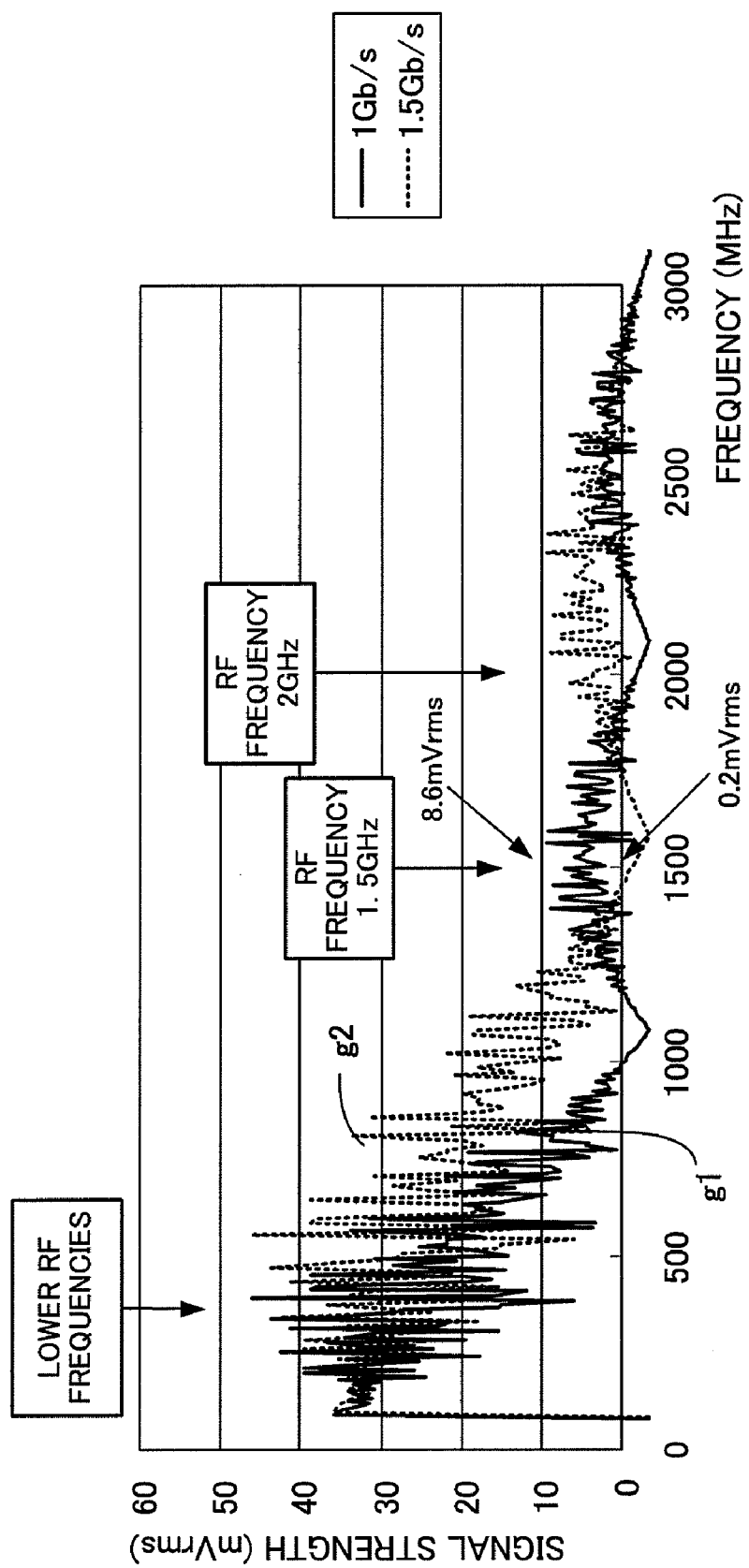
FIG. 16 represents frequency spectra of signals traveling through the digital interface.

Noise produced around the receiving line 42 of the communication line 40 strongly interferes with the receiving system of the antenna section 10, as stated above with reference to FIG. 16. Accordingly, setting the transfer bit rate of the receiving line 42 to an optimum bit rate in accordance with the receive RF frequency is effective in restraining such interference.

In the case of the transmitting system of the antenna section 10, on the other hand, the transmit power is high, and therefore, it is unlikely that noise, if produced to a certain degree around the transmitting line 41 and leaks into the junction of the transmitting system between the antenna section 10 and the RF-IC 20, causes such an interference as to substantially lower the transmission quality.

Accordingly, the bit rate selected for the receiving line 42 need not necessarily be set with respect to the transmitting line 41. For the transmitting line 41, a fixed lower-limit bit rate calculated from the transmission band may be set in advance, and only the bit rate of the receiving line 42 may be variably set.

Thus, where wireless communication is performed according to TDD (Time Division Duplex: a communication scheme wherein time is allocated separately to transmission and reception; the antenna section 10 is configured to carry out TDD communication), data transmission is not executed during data reception, and therefore, the fixed bit rate is set with respect to the transmitting line 41, as stated above, while the bit rate of the receiving line 42 is variably set in accordance with the receive RF frequency.

During the data reception, the RF-IC 20 transfers data to the PHY 30 via the receiving line 42 at the optimum bit rate. Accordingly, noise leak from around the receiving line 42 is restrained, and also since no data transmission is executed during the data reception, no noise leaks from the transmitting line 41.

On the other hand, during the data transmission, data reception is stopped, and therefore, no noise leaks from the receiving line 42. Although the RF-IC 20 and the PHY 30 communicate via the transmitting line 41 at the fixed bit rate, degradation of the transmission quality due to noise leak does not occur because the transmit power of the transmitting system of the antenna section 10 is high.

Also in the case of performing TDD communication, a bit rate corresponding to the RF frequency may be set with respect to both the transmitting and receiving lines 41 and 42. Further, where the device is configured so as to carry out communication other than TDD communication, a bit rate corresponding to the RF frequency may be set for both the transmitting and receiving lines 41 and 42, and if noise produced around the transmitting line 41 causes only a low level of interference, a fixed bit rate may be set with respect to the transmitting line 41.

Figure 6:
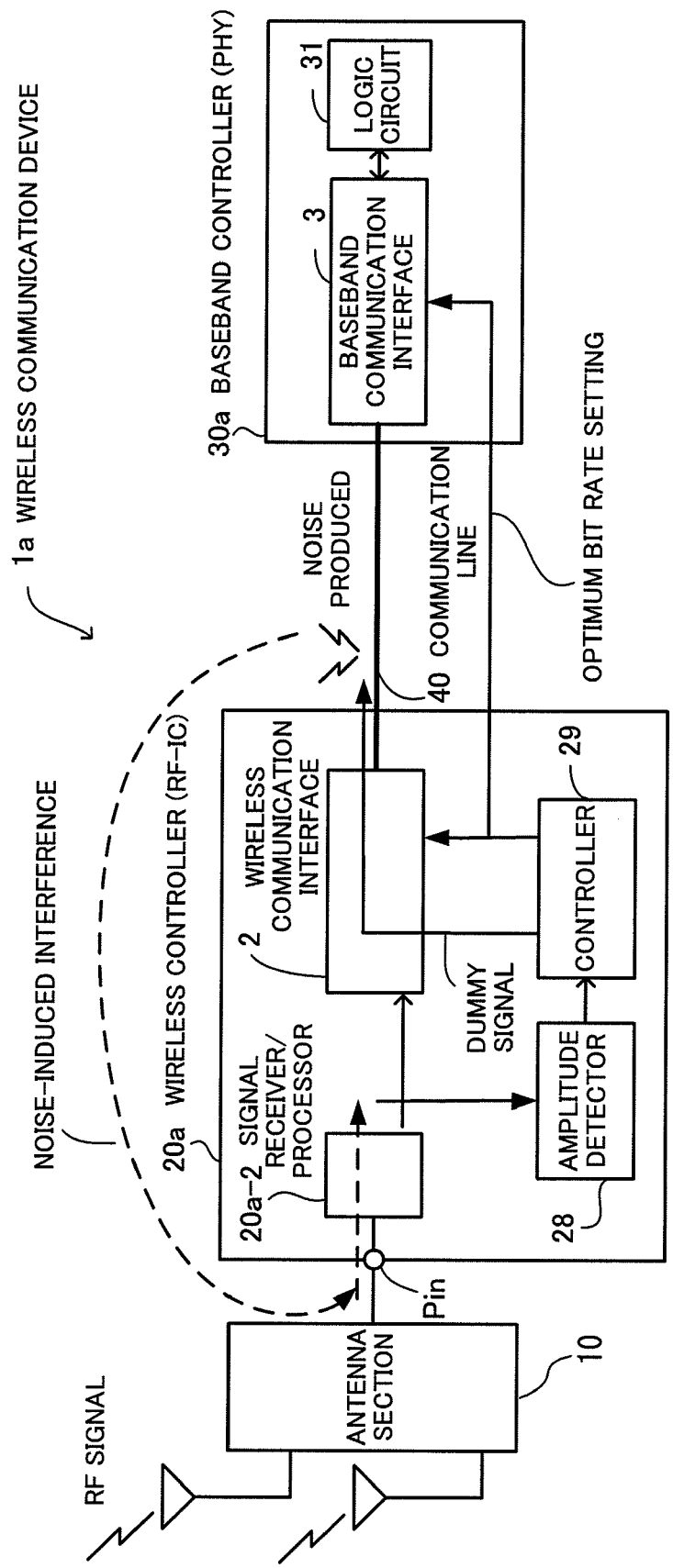
FIG. 6 illustrates the configuration of another wireless communication device.

Bit rate setting according to another embodiment of the invention will be now described. FIG. 6 illustrates the configuration of a wireless communication device. The wireless communication device 1a comprises the antenna section 10, an RF-IC 20a, and a PHY 30a. The RF-IC 20a and the PHY 30a are interconnected by the communication line 40.

The antenna section 10 transmits and receives RF signals through antennas. The RF-IC 20a includes a signal receiver/processor 20a-2, the wireless communication interface 2, an amplitude detector 28, and a controller 29.

The signal receiver/processor 20a-2 performs frequency conversion as well as A/D conversion on the received RF signal to obtain a baseband signal. The wireless communication interface 2 controls transfer of the baseband signal converted from the RF signal to the PHY 30a and also controls reception of a baseband signal from the PHY 30a.

The controller 29 carries out overall control of the elements in the RF-IC 20a. For example, the controller 29 sets communication frequencies for the individual elements in the RF-IC 20a, generates a dummy signal, and variably sets the bit rate of the communication line 40.

The PHY 30a includes the baseband communication interface 3 and the logic circuit 31. The baseband communication interface 3 controls transfer of the baseband signal received from the logic circuit 31 to the RF-IC 20a and also controls reception of the baseband signal from the RF-IC 20a. The logic circuit 31 performs the process of generating and receiving RF signals.

At the startup of the device, the controller 29 outputs a dummy signal at a certain bit rate to be transferred along the communication line 40 via the wireless communication interface 2. At this time, since the dummy signal travels along the communication line 40, noise is produced around the communication line 40. The noise thus produced leaks through the air, GND, power supply or the like to the input terminal Pin of the RF-IC 20a to which the RF signal from the antenna section 10 is input, and enters the signal receiver/processor 20a-2.

The amplitude detector 28 detects, on the output side of the signal receiver/processor 20a-2, the amplitude (power) indicative of the strength of the interference caused by noise produced around the communication line 40. The controller 29 determines whether or not the detected amplitude is greater than a prescribed value set in advance and, if the prescribed value is exceeded, outputs again the dummy signal with the bit rate changed.

If, as a result of the above control, an amplitude not greater than the prescribed value is detected, a bit rate identical with that of the dummy signal at which the detected amplitude was obtained is set in the wireless communication interface 2 and the baseband communication interface 3.

Figure 7:
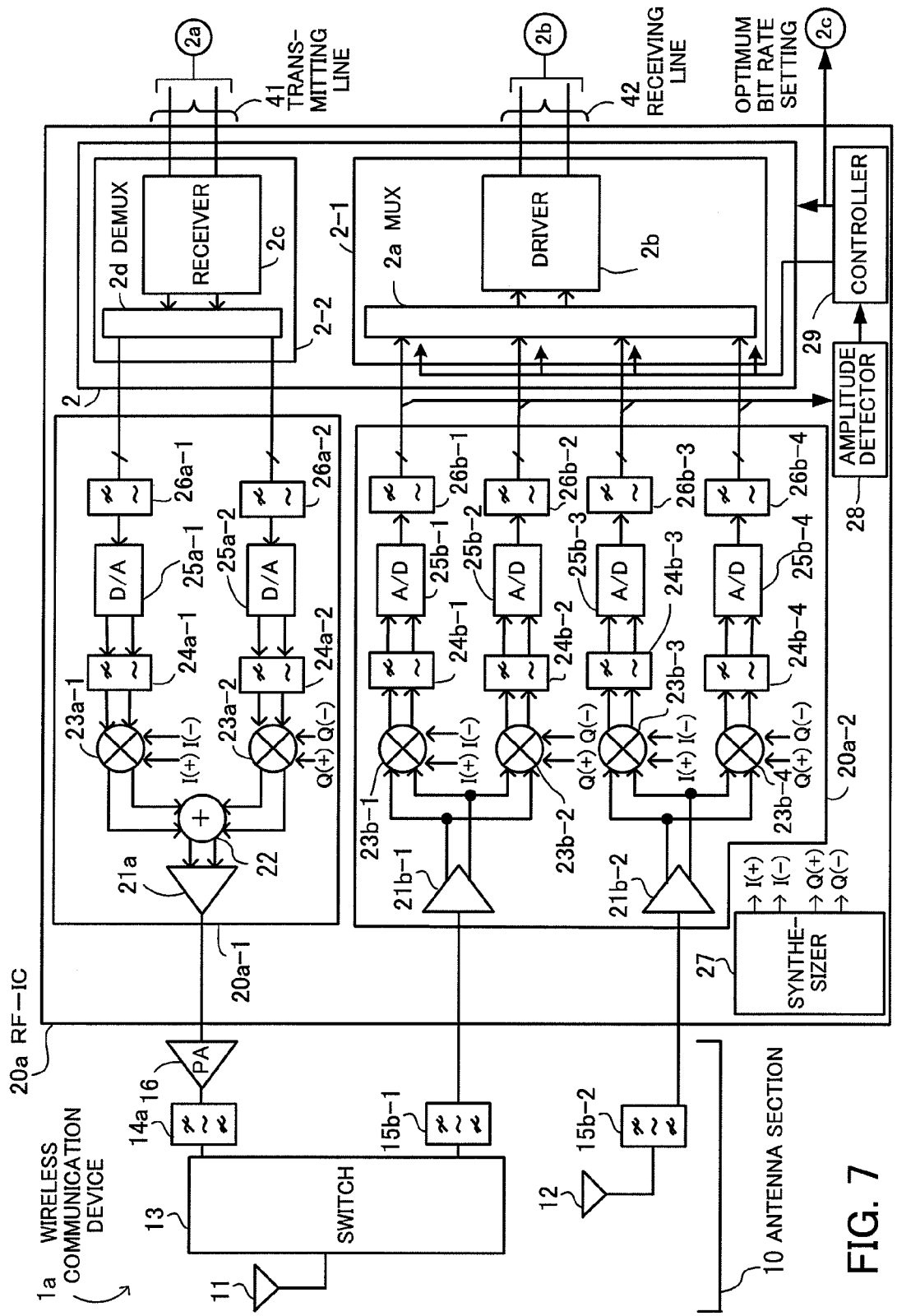
FIG. 7 is a first block diagram of the wireless communication device.
Figure 8:
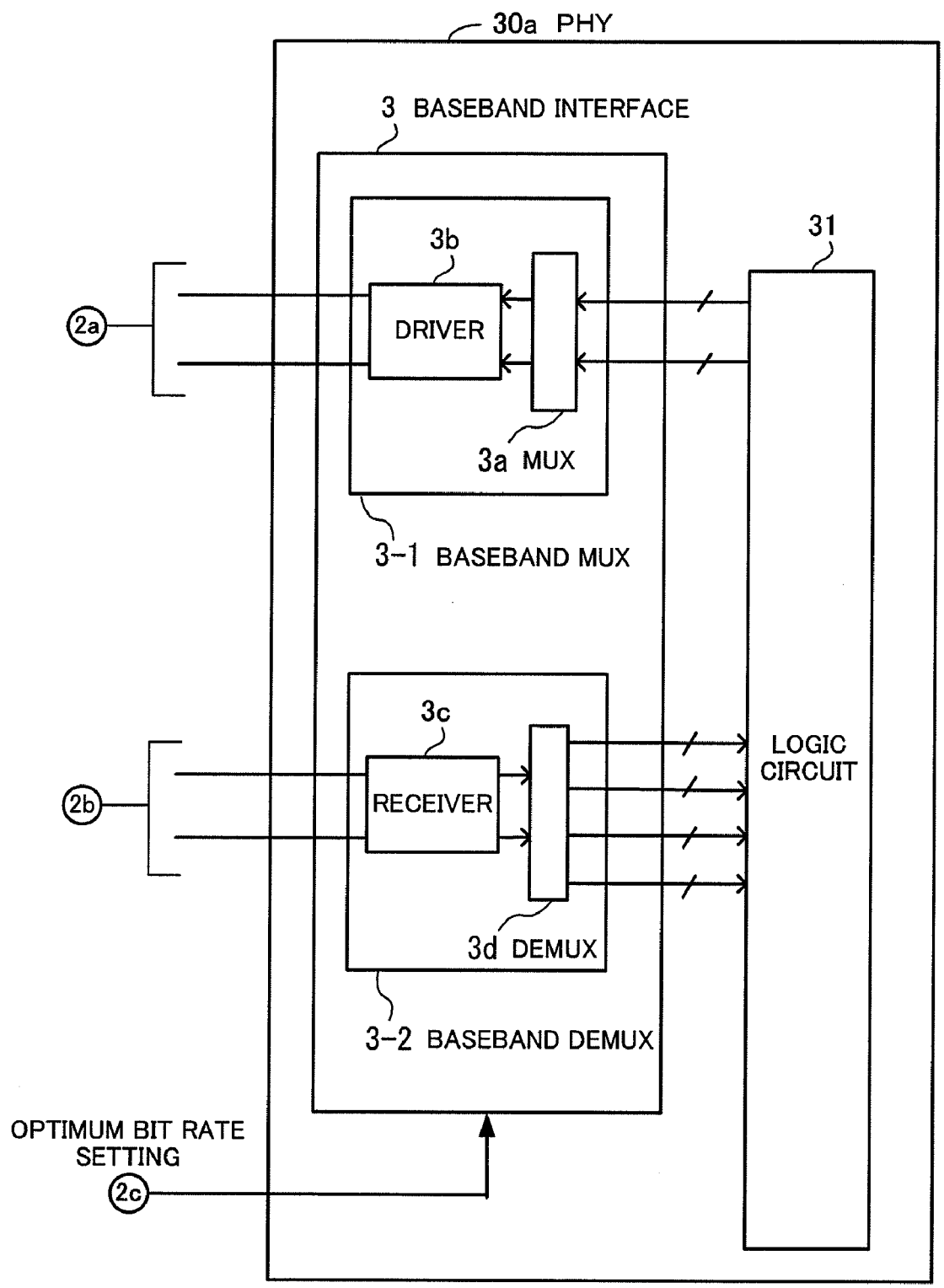
FIG. 8 is a second block diagram of the wireless communication device.

FIGS. 7 and 8 are block diagrams of the wireless communication device 1a. The data transmission and reception processes are identical with those explained above with reference to FIGS. 3 and 4; therefore, description of the processes is omitted and only the configuration of the device 1a will be explained. The antenna section 10 comprises the antennas 11 and 12, the switch 13, the band-pass filters 14a, 15b-1 and 15b-2, and the power amplifier 16. The RF-IC 20a comprises a signal transmitter/processor 20a-1, the signal receiver/processor 20a-2, the wireless communication interface 2, the synthesizer 27, the amplitude detector 28, and the controller 29.

The signal transmitter/processor 20a-1 includes the amplifier 21a, the adder 22, the mixers 23a-1 and 23a-2, the low-pass filters 24a-1 and 24a-2, the D/A converters 25a-1 and 25a-2, and the low-pass filters 26a-1 and 26a-2.

The signal receiver/processor 20a-2 includes the amplifiers 21b-1 and 21b-2, the mixers 23b-1 to 23b-4, the low-pass filters 24b-1 to 24b-4, the A/D converters 25b-1 to 25b-4, and the low-pass filters 26b-1 to 26b-4.

The wireless communication interface 2 comprises the wireless communication multiplexer 2-1 and the wireless communication demultiplexer 2-2. The wireless communication multiplexer 2-1 includes the multiplexer 2a and the driver 2b, and the wireless communication demultiplexer 2-2 includes the receiver 2c and the demultiplexer 2d.

The PHY 30a comprises the baseband communication interface 3 and the logic circuit 31. The baseband communication interface 3 includes the baseband communication multiplexer 3-1 and the baseband communication demultiplexer 3-2. The baseband communication multiplexer 3-1 includes the multiplexer 3a and the driver 3b, and the baseband communication demultiplexer 3-2 includes the receiver 3c and the demultiplexer 3d.

The communication line 40 comprises the transmitting line 41 and the receiving line 42 (the transmitting and receiving lines 41 and 42 are both digital interface lines). The driver 2b in the wireless communication interface 2 and the receiver 3c in the baseband communication interface 3 are connected to each other by the receiving line 42 of the communication line 40. The driver 3b in the baseband communication interface 3 and the receiver 2c in the wireless communication interface 2 are connected to each other by the transmitting line 41 of the communication line 40.

Figure 9:
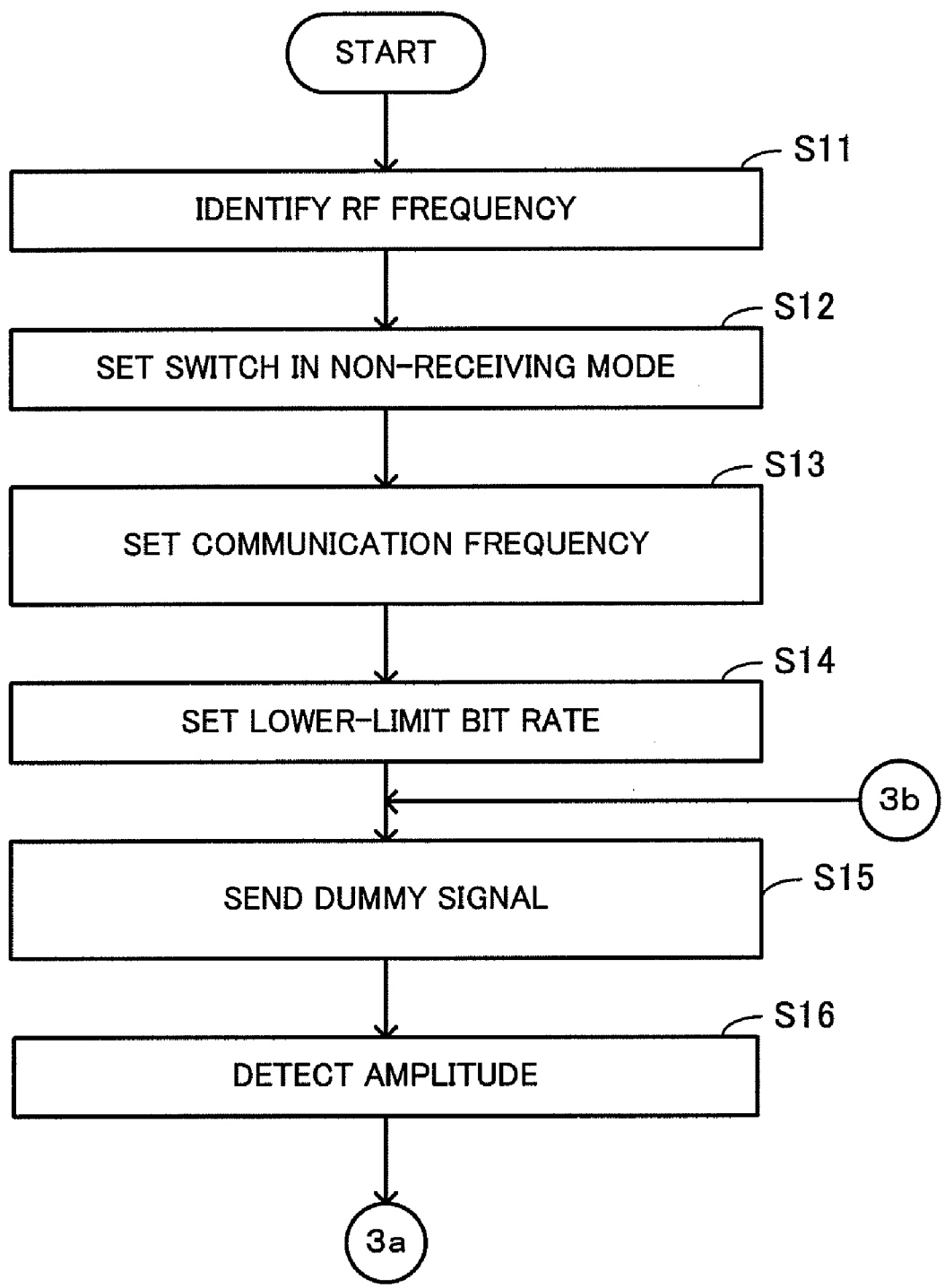
FIG. 9 is a first flowchart illustrating the manner of how an optimum bit rate is set.
Figure 10:
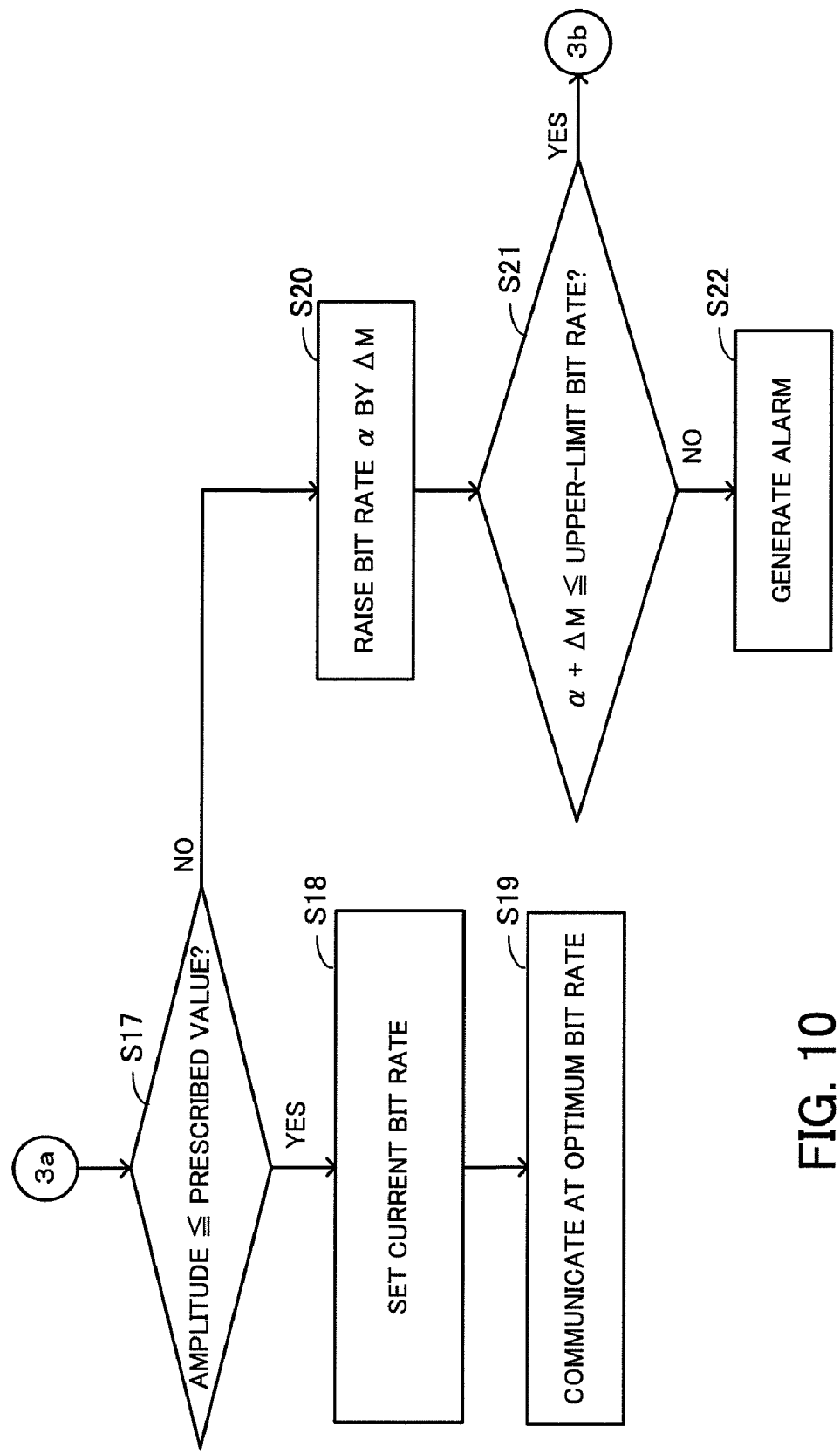
FIG. 10 is a second flowchart illustrating the manner of how the optimum bit rate is set.

The following describes in detail the manner of how the optimum bit rate is set in the wireless communication device 1a. FIGS. 9 and 10 are flowcharts illustrating the optimum bit rate setting process, wherein all steps are executed when the device is actually used.

S11: The logic circuit 31 identifies the receive RF frequency to be received.

S12: The switch 13 in the antenna section 10 is set in a mode in which no RF signal is received. For example, the switch 13 is set to the transmit side (the antenna 11 is connected to the output terminal of the band-pass filter 14a) or is opened (the antenna 11 is connected neither to the band-pass filter 14a nor to the band-pass filter 15b-1).

S13: The controller 29 sets the communication frequency (RF frequency) with respect to the individual filters and the synthesizer 27 in the RF-IC 20a.

S14: The controller 29 sets the bit rate for the dummy signal to the lower-limit bit rate that can be set with respect to the receiving line 42.

S15: The controller 29 outputs the dummy signal to the four input terminals of the multiplexer 2a in the wireless communication interface 2. The dummy signal output from the controller 29 is transferred to the PHY 30a through the multiplexer 2a, the driver 2b, and the receiving line 42.

S16: The amplitude detector 28 detects, on the output side of the signal receiver/processor 20a-2, the amplitude indicative of the strength of the interference caused by noise produced around the receiving line 42, and notifies the controller 29 of the detection result. Specifically, the amplitude detector 28 detects the amplitudes of the signals output from the respective low-pass filters 26b-1 to 26b-4, then obtains a sum of the detected amplitudes, and notifies the controller 29 of the obtained sum.

S17: The controller 29 determines whether or not the detected amplitude (sum) is greater than the prescribed value. If the prescribed value is not exceeded by the detected amplitude, the flow proceeds to Step S18; if the prescribed value is exceeded, the flow proceeds to Step S20.

S18: A bit rate identical with that of the dummy signal at which the amplitude detected in Step S16 was obtained is set with respect to the multiplexer 2a and the demultiplexer 2d in the wireless communication interface 2 as well as the multiplexer 3a and the demultiplexer 3d in the baseband communication interface 3.

S19: The wireless communication interface 2 transfers data to the baseband communication interface 3 through the communication line 40 at the thus-set optimum bit rate.

S20: The controller 29 raises the currently set bit rate α of the dummy signal by ΔM.

S21: The controller 29 determines whether or not the set bit rate (α+ΔM) assumes a value smaller than or equal to the upper-limit bit rate of the receiving line 42. If the set bit rate is lower than or equal to the upper-limit bit rate (α+ΔM≦upper-limit bit rate), the flow returns to Step S15; if the upper-limit bit rate is exceeded (upper-limit bit rate<α+ΔM), the flow proceeds to Step S22.

S22: The controller 29 notifies the logic circuit 31 that there is no bit rate that can be set for the receiving line 42 in order to reduce the noise interference to a desired level, whereupon the logic circuit 31 generates an alarm.

Thus, when setting the optimum bit rate, the dummy signal is output with its bit rate successively varied from the lower-limit bit rate to the upper-limit bit rate of the receiving line 42, and the amplitude indicative of the extent of noise leak from the receiving line 42 is detected. Then, it is determined whether or not the detected amplitude is greater than the prescribed value, and if a bit rate at which the amplitude does not exceed the prescribed value is detected, this bit rate is set with respect to the receiving line.

According to the aforementioned control procedure, if an amplitude not exceeding the prescribed value is detected in the process of sweeping the bit rate of the dummy signal from the lower-limit bit rate to the upper-limit bit rate, the sweeping is instantly suspended, and a bit rate identical with that of the dummy signal at which the detected amplitude was obtained is set in the wireless communication interface 2 and the baseband communication interface 3.

As an alternative control procedure, all bit rates that can be set for the receiving line 42 may be swept from the lower-limit bit rate to the upper-limit bit rate, and a plurality of amplitudes which are judged to be smaller than or equal to the prescribed value may be stored in memory. After the sweeping is finished, the smallest value among the stored amplitudes may be extracted.

Then, a bit rate identical with that of the dummy signal at which the smallest value was obtained may be set in the wireless communication interface 2 and the baseband communication interface 3.

Figure 11:
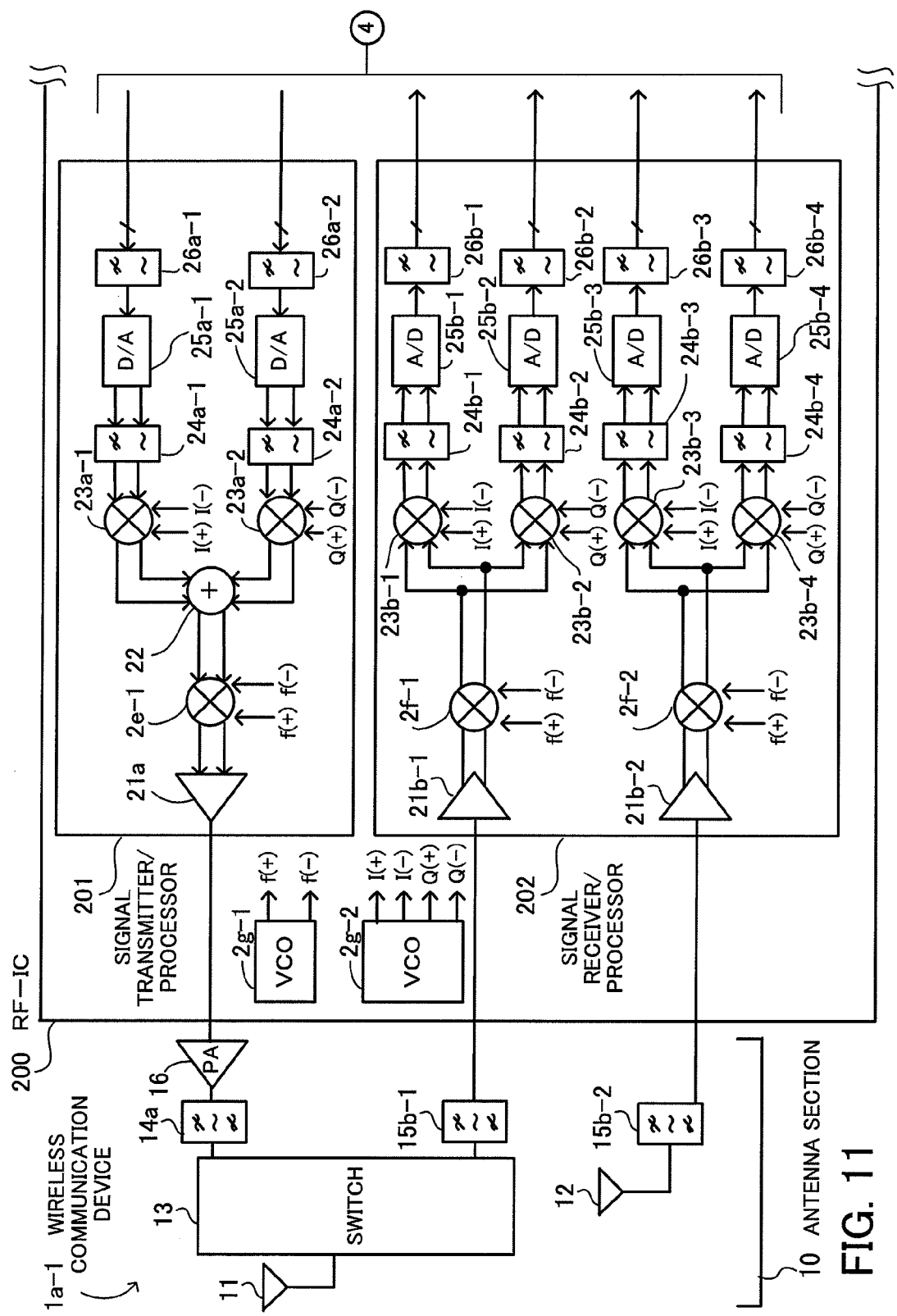
FIG. 11 is a first block diagram of a wireless communication device.
Figure 12:
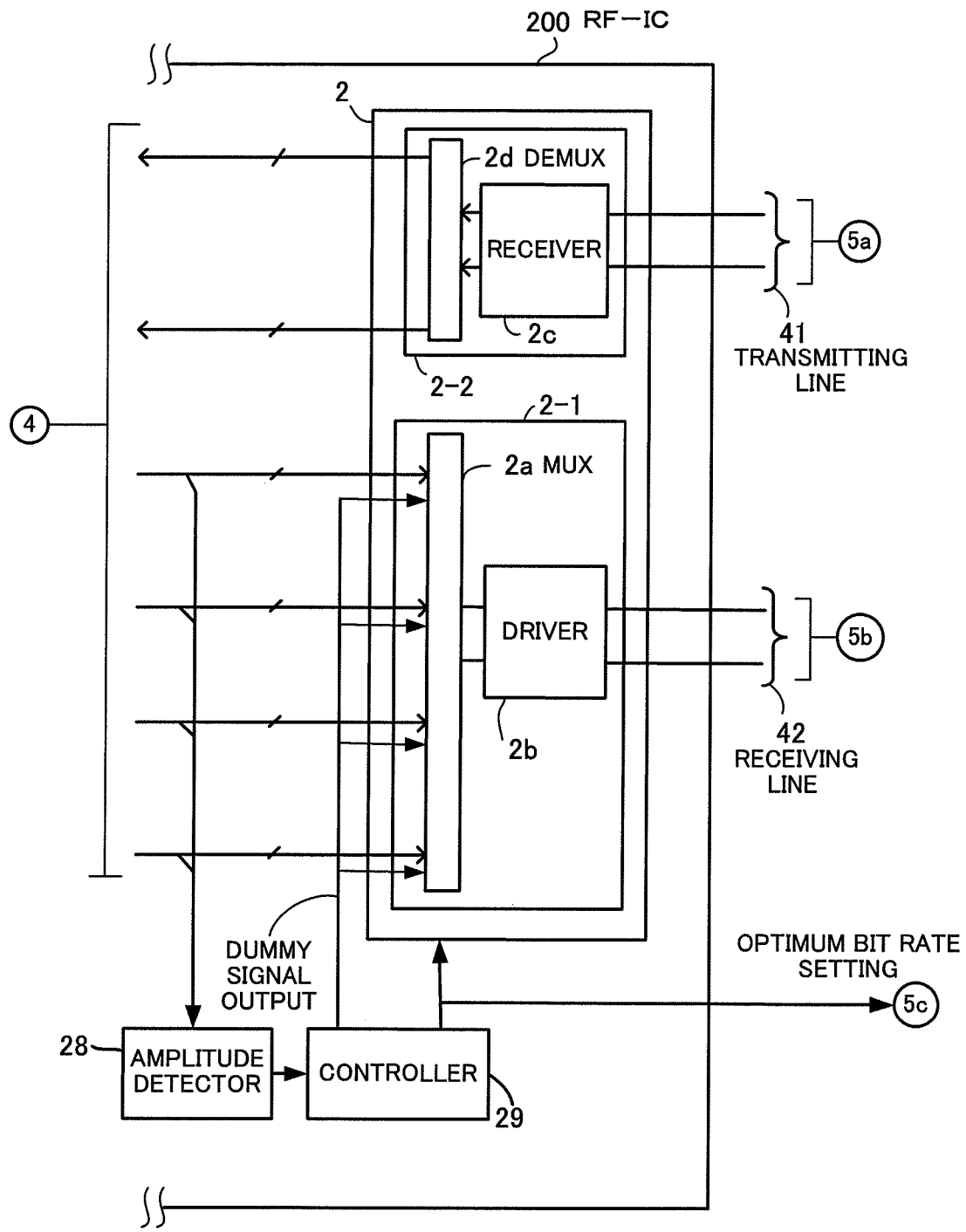
FIG. 12 is a second block diagram of the wireless communication device.
Figure 13:
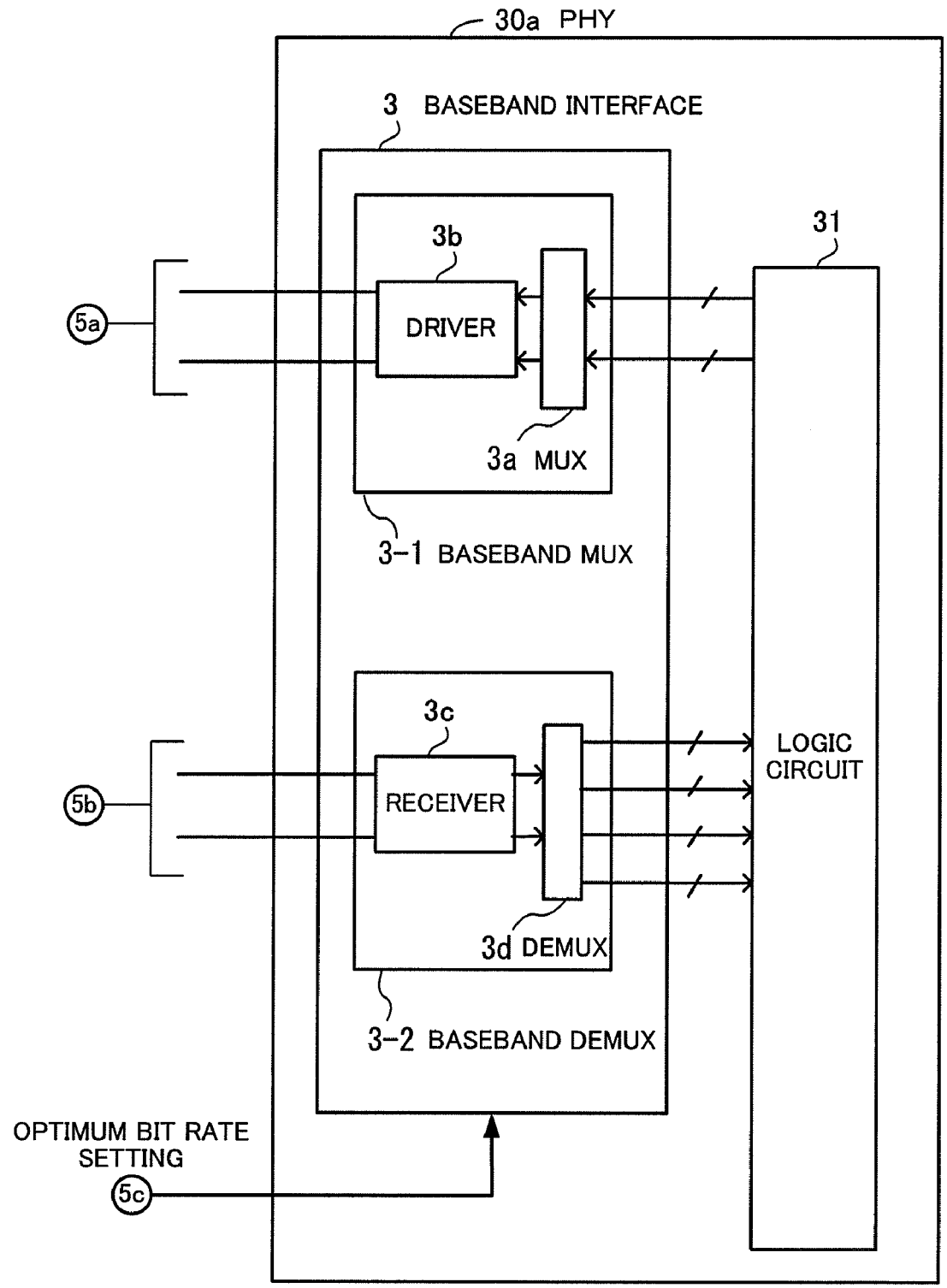
FIG. 13 is a third block diagram of the wireless communication device.
Figure 14:
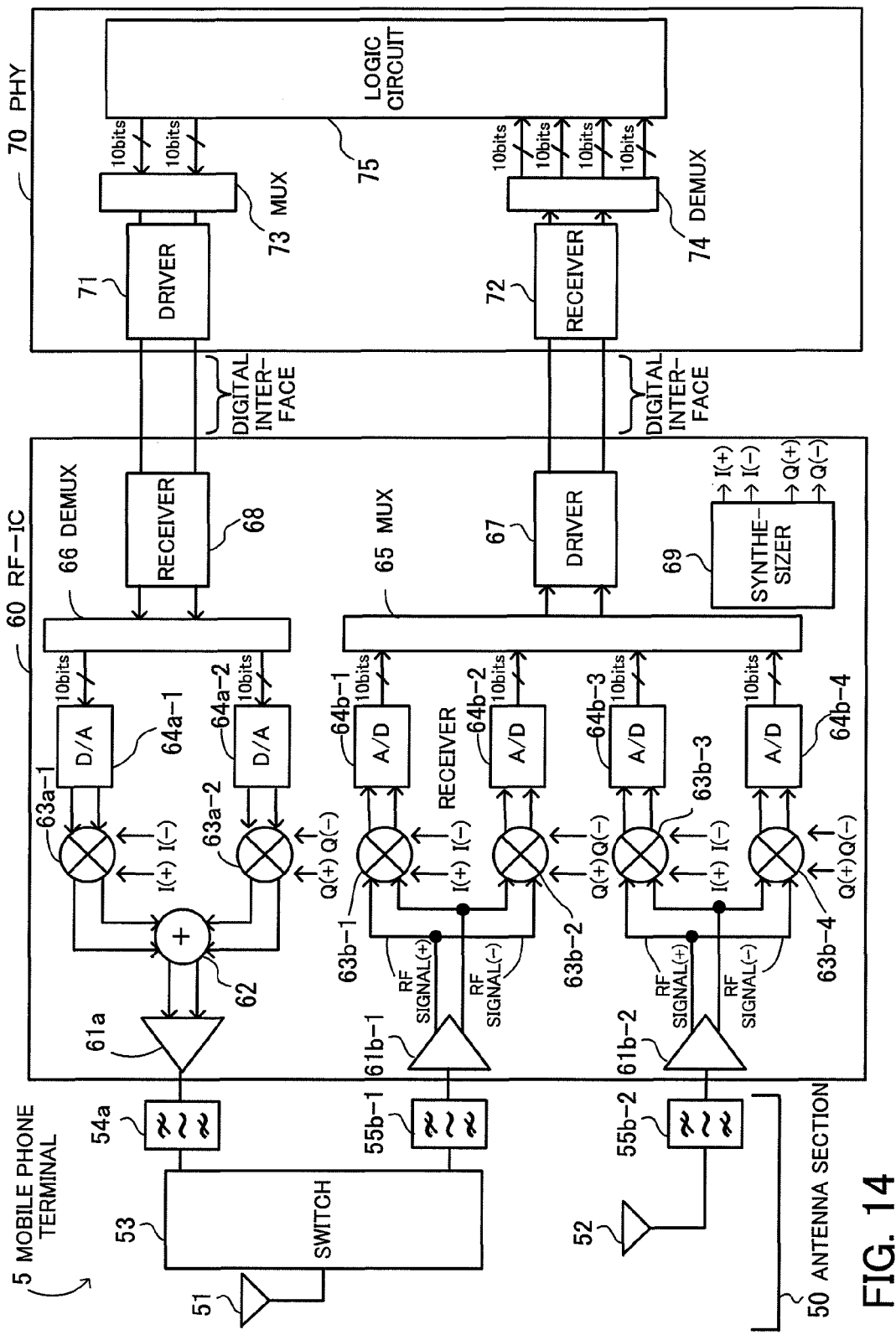
FIG. 14 illustrates a schematic configuration of a mobile phone terminal.
Figure 15:
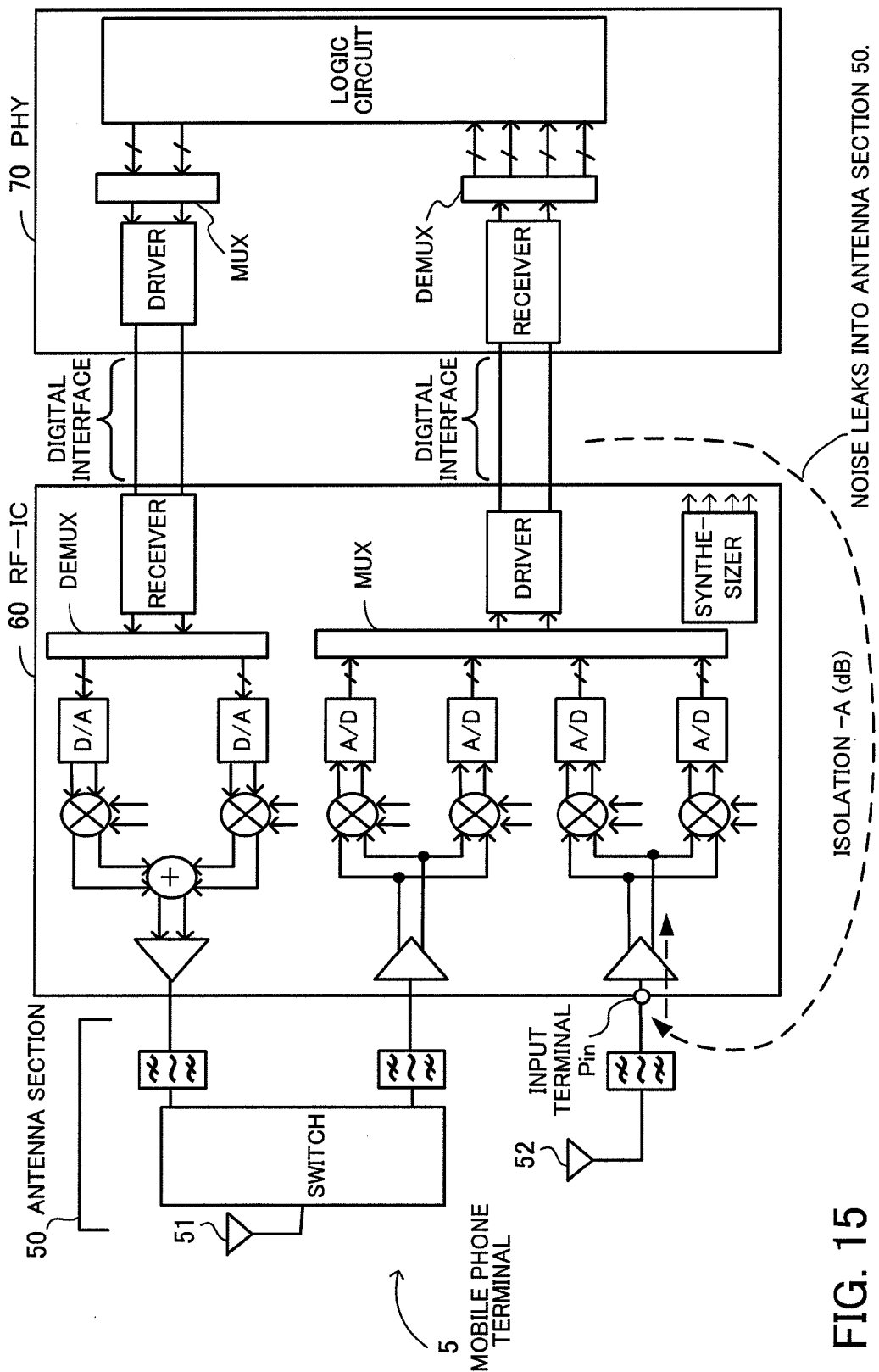
FIG. 15 is a conceptual diagram illustrating interference between a digital interface and an antenna section.

The following describes the case where the bit rate setting control of the wireless communication device 1a is applied to a superheterodyne (double conversion) type device. FIGS. 11 to 13 are block diagrams illustrating such a wireless communication device.

The wireless communication device 1a-1 comprises the antenna section 10, an RF-IC 200 and the PHY 30a, and is of a superheterodyne type in which, when data is transmitted, the baseband signal is first up-converted to IF frequency band and then to RF frequency band, and when data is received, the received RF frequency is first down-converted to the IF frequency band to obtain a baseband signal.

The illustrated blocks are identical with those illustrated in FIG. 7 except that the RF-IC 200 is configured differently from the RF-IC 20a. In the following, therefore, the RF-IC 200 will be explained. The RF-IC 200 comprises a signal transmitter/processor 201, a signal receiver/processor 202, the wireless communication interface 2, VCOs (Voltage Controlled Oscillators) 2g-1 and 2g-2, the amplitude detector 28, and the controller 29.

The signal transmitter/processor 201 additionally includes a mixer 2e-1 connected between the amplifier 21a and the adder 22. The signal receiver/processor 202 additionally includes a mixer 2f-1 connected between the amplifier 21b-1 and the mixers 23b-1 and 23b-2, as well as a mixer 2f-2 connected between the amplifier 21b-2 and the mixers 23b-3 and 23b-4.

The VCO 2g-1 outputs local signals f(+) and f(−) for the frequency conversion between RF and IF frequencies. The VCO 2g-2 outputs I local signals I(+) and I(−) having the same frequency as the IF frequency, and also outputs Q local signals Q(+) and Q(−) of the same frequency. In other respects, the configuration of the RF-IC 200 is identical with that of the RF-IC 20a.

The conversion between RF and IF frequencies will be explained. When an RF signal is received, the mixer 2f-1 mixes the two RF signals output from the amplifier 21b-1 with the local signals f(+) and f(−), to generate IF signals. The IF signals are then mixed with the local signals I(+) and I(−) by the mixer 23b-1 to be converted to baseband signals, and also mixed with the local signals Q(+) and Q(−) by the mixer 23b-2 to be converted to baseband signals. The mixer 2f-2 operates in the same manner.

When an RF signal is to be transmitted, the mixer 23a-1 mixes the baseband signals with the local signals I(+) and I(−) to convert the baseband signals to IF signals, and the mixer 23a-2 mixes the baseband signals with the local signals Q(+) and Q(−) to convert the baseband signals to IF signals. The IF signals output from the adder 22 are mixed with the local signals f(+) and f(−) by the mixer 2e-1, thus generating an RF signal.

To give concrete values, where the frequency of the RF signal to be received is 4.5 GHz and the frequency of the local signals f(+) and f(−) is 3.5 GHz, for example, the output frequency of the mixers 2f-1 and 2f-2 is 1 GHz (=4.5 GHz−3.5 GHz) and the frequency of the local signals I(+), I(−), Q(+) and Q(−) is equal to the output frequency of the mixers 2f-1 and 2f-2, namely, 1 GHz.

The bit rate is set in the same manner as in the wireless communication device 1a. Specifically, when the device 1a-1 is started, the dummy signal is output at a certain bit rate to be transferred over the communication line 40, and the amplitude indicative of the strength of the interference induced by noise produced around the receiving line 42 is detected. Then, it is determined whether or not the detected amplitude is greater than the prescribed value set beforehand, and if it is judged that the amplitude is not greater than the prescribed value, a bit rate identical with that of the dummy signal at which the detected amplitude was obtained is set in the wireless communication interface 2 and the baseband communication interface 3.

In the case of the direct conversion type wireless communication device in which the receive RF frequency is directly converted to baseband signals, noise produced around the receiving line 42 and leaking into the input terminal Pin interferes with the RF frequency that is to be subjected to the mixing prior to the generation of baseband signals, and thus the RF frequency alone needs to be given attention as a frequency liable to be affected by the interference. Accordingly, the direct conversion type device may have a configuration wherein a table showing the correspondence between RF frequencies and applicable bit rates is prepared so that an optimum bit rate can be selected in accordance with the receive RF frequency, as described above with reference to FIG. 5.

On the other hand, in the superheterodyne type wireless communication device in which baseband signals are obtained after the receive RF frequency is converted to IF frequency, the IF-stage processing is performed prior to the mixing process and the subsequent generation of the baseband signals. Thus, the interference exerts an influence not only on the RF frequency but on the IF frequency and the frequencies (LO frequencies) of the local signals output from the VCOs. In the case of the superheterodyne type device, therefore, an optimum bit rate fails to be set if the RF frequency alone is taken into consideration, unlike the direct conversion type device.

Accordingly, when an optimum bit rate is to be set, the method is employed in which the dummy signal is made to travel through the wireless communication interface 2 and the receiving line 42, and the amplitude influenced by actually occurring noise interference is measured with the bit rate of the dummy signal varied successively, to find a bit rate at which the amplitude remains at or below the allowable level. In this case, since the optimum bit rate is derived with the use of transfer paths through which leakage noise actually passes, noise interference attributable not only to the RF frequency but to the IF and LO frequencies can virtually be taken into account when the optimum bit rate is set, and therefore, the bit rate setting method can be effectively applied to superheterodyne type wireless communication devices. Also, since the optimum bit rate is set with the dummy signal passed through individual devices to actually cause noise interference, it is possible to set the optimum bit rate that may vary from device to device depending on the configuration of packaged elements.

According to the present invention, the bit rate of the communication line interconnecting the wireless controller and the baseband controller is variably set in accordance with the receive radio frequency, whereby the occurrence of interference can be restrained, making it possible to improve the transmission quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless communication device for performing wireless communication, comprising:
   an antenna section for transmitting and receiving a radio signal;
   a wireless controller for converting the receive radio signal to a receive baseband signal and converting a transmit baseband signal to the radio signal, the wireless controller including a wireless communication interface for controlling transfer of the receive baseband signal converted from the receive radio signal and reception of the transmit baseband signal; and
   a baseband controller for processing the transmit baseband signal and the receive baseband signal, the baseband controller including a baseband communication interface connected to the wireless communication interface by a communication line, for controlling transfer/reception of the transmit and receive baseband signals, a memory, and a logic circuit for variably setting a bit rate of the communication line,
   wherein the memory stores applicable bit rates for the communication line in association with respective different radio frequencies of the receive radio signal, and
   wherein the logic circuit reads, from the memory, a bit rate corresponding to the frequency of the receive radio signal and sets the read bit rate as a transfer rate between the wireless communication interface and the baseband communication interface.

2. The wireless communication device according to claim 1, wherein:
   the wireless communication interface includes a wireless communication multiplexer for multiplexing a plurality of digital receive baseband signals converted from the radio signal into a multiplexed signal and digitally transferring the multiplexed signal, and a wireless communication demultiplexer for demultiplexing a multiplexed transmit baseband signal received from the baseband controller, the baseband communication interface includes a baseband communication multiplexer for sending the multiplexed transmit baseband signal to the wireless controller, and a baseband communication demultiplexer for receiving the multiplexed signal from the wireless controller and demultiplexing the multiplexed signal, the baseband communication multiplexer and the wireless communication demultiplexer are connected to each other by a transmitting line in the communication line, the wireless communication multiplexer and the baseband communication demultiplexer are connected to each other by a receiving line in the communication line, and the memory stores, with respect to each of the radio frequencies of the receive radio signal, an optimum bit rate for the receiving line at which an amount of noise leaking from around the receiving line at a corresponding radio frequency of the receive radio signal is minimized.

3. The wireless communication device according to claim 2, wherein:

the wireless communication device performs wireless communication according to time division duplex, during data transmission, the baseband communication multiplexer transfers data to the wireless communication demultiplexer via the transmitting line at a preset fixed bit rate, and during data reception, the wireless communication multiplexer transfers data to the baseband communication demultiplexer via the receiving line at the optimum bit rate read from the memory.

4. The wireless communication device according to claim 1, wherein the bit rates stored in the memory each have a value obtained by dividing a value of a corresponding one of the radio frequencies by an integer.

5. A wireless communication device for performing wireless communication, comprising:

an antenna section for transmitting and receiving a radio signal;

a wireless controller for converting the receive radio signal to a receive baseband signal and converting a transmit baseband signal to the radio signal, the wireless controller including a wireless communication interface for controlling transfer of the receive baseband signal converted from the receive radio signal and reception of the transmit baseband signal, an amplitude detector, and a controller for generating a dummy signal and variably setting a bit rate; and a baseband controller for processing the receive baseband signal and the transmit baseband signal, the baseband controller including a baseband communication interface connected to the wireless communication interface by a communication line, for controlling transfer/reception of the receive and transmit baseband signals, wherein, if strength of interference measured with the dummy signal transferred through the communication line is not greater than a prescribed value, the controller sets a bit rate at which the dummy signal is then transferred, as a transfer rate between the wireless communication interface and the baseband communication interface.

6. The wireless communication device according to claim 5, wherein the controller first outputs the dummy signal at a lower-limit bit rate, among bit rates that can be set with respect to the communication line, and sweeps the bit rate for the dummy signal successively up to an upper-limit bit rate, to make a determination as to whether the measured strength of interference is greater than the prescribed value or not.

7. The wireless communication device according to claim 6, wherein, if an amplitude not exceeding the prescribed value is detected while the bit rate is swept from the lower-limit bit rate to the upper-limit bit rate, the controller suspends the sweeping and sets, in the wireless communication interface and the baseband communication interface, a bit rate identical with that of the dummy signal at which the detected amplitude was obtained.

8. The wireless communication device according to claim 6, wherein the controller allows the dummy signal to sweep all bit rates from the lower-limit bit rate to the upper-limit bit rate that can be set with respect to the communication line, then identifies a smallest value among a plurality of amplitudes that are judged to be smaller than or equal to the prescribed value as a result of the determination, and sets, in the wireless communication interface and the baseband communication interface, a bit rate identical with that of the dummy signal at which the smallest value was obtained.

9. The wireless communication device according to claim 5, wherein the controller allows the dummy signal to sweep all bit rates from the lower-limit bit rate to the upper-limit bit rate that can be set with respect to the communication line, and if all of detected amplitudes are judged to be greater than the prescribed value as a result of the determination, the baseband controller generates an alarm.

10. A wireless communication method for performing wireless communication while restraining interference, wherein:

the wireless communication method is applied to a device comprising a wireless controller for converting a receive radio signal to a receive baseband signal and converting a transmit baseband signal to a radio signal, and a baseband controller for processing the transmit baseband signal and the receive baseband signal, the wireless controller includes a wireless communication interface for controlling transfer of the receive baseband signal converted from the receive radio signal and reception of the transmit baseband signal, and the baseband controller includes a baseband communication interface connected to the wireless communication interface by a communication line, for controlling transfer/reception of the transmit and receive baseband signals, the device performs first interference restraint control or second interference restraint control in order to restrain interference caused by noise produced around the communication line, the first interference restraint control comprises:

the step of storing, in a memory, bit rates for the communication line at which interference caused by noise produced around the communication line is minimized, in such a manner that the stored bit rates are association with respective different radio frequencies of the receive radio signal;

the step, executed on detection of a receive radio frequency to be received, of reading, from the memory, an optimum bit rate which corresponds to the receive radio frequency and at which the interference is minimized; and the step of setting the optimum bit rate in the wireless communication interface and the baseband communication interface, the second interference restraint control comprises:

the step of outputting a dummy signal to detect an amplitude indicative of strength of the interference;

the step of determining whether or not the detected amplitude is greater than a prescribed value;

the step, executed when the detected amplitude is greater than the prescribed value, of outputting the dummy signal at a different bit rate; and the step, executed when it is judged that the detected amplitude is not greater than the prescribed value, of setting, in the wireless communication interface and the baseband communication interface, a bit rate identical with that of the dummy signal at which the detected amplitude was obtained, where the wireless controller performs wireless communication according to direct conversion scheme, either the first interference restraint control or the second interference restraint control is selected to restrain the interference, and where the wireless controller performs wireless communication according to superheterodyne scheme, the second interference restraint control is selected to restrain the interference.

11. A baseband processor packaged into a wireless communication device including an antenna section for transmitting and receiving a radio signal, and an RF transceiver for converting the receive radio signal to a receive baseband signal and converting a transmit baseband signal to the radio signal, the RF transceiver including a wireless communication interface for controlling transfer of the receive baseband signal converted from the receive radio signal and reception of the transmit baseband signal, the baseband processor comprising:

a baseband communication interface connected to the wireless communication interface by a communication line, for controlling transfer/reception of the transmit and receive baseband signals;

a memory; and a logic circuit for variably setting a bit rate of the communication line, wherein the memory stores, with respect to individual radio frequencies of the radio signal received by the antenna section, applicable bit rates for the communication line at which interference caused by noise produced around the communication line is minimized, and wherein, when notified of a receive radio frequency to be received, the logic circuit reads, from the memory, an optimum bit rate which corresponds to the receive radio frequency and at which the interference is minimized, and sets the optimum bit rate in the wireless communication interface and the baseband communication interface.

12. An RF transceiver packaged into a wireless communication device including an antenna section for transmitting and receiving a radio signal, and a baseband processor for processing a transmit baseband signal and a receive baseband signal, the baseband processor including a baseband communication interface for controlling transfer/reception of the transmit and receive baseband signals, the RF transceiver comprising:

a wireless communication interface connected to the baseband communication interface by a communication line, for controlling transfer of the receive baseband signal converted from the radio signal and reception of the transmit baseband signal;

an amplitude detector; and a controller for generating a dummy signal and variably setting a bit rate when the wireless communication device is started;

wherein, if noise produced around the communication line as the dummy signal travels through the communication line causes interference, the amplitude detector detects an amplitude indicative of strength of the interference, and the controller determines whether or not the detected amplitude is greater than a prescribed value, outputs the dummy signal at a different bit rate if the detected amplitude is greater than the prescribed value, and, if it is judged that the detected amplitude is not greater than the prescribed value, sets a bit rate identical with that of the dummy signal at which the detected amplitude was obtained, in the wireless communication interface and the baseband communication interface.

* * * * *